United States Patent [19]

Best et al.

[11] Patent Number: 4,839,743
[45] Date of Patent: Jun. 13, 1989

[54] INTERACTIVE VIDEO AND AUDIO CONTROLLER

[75] Inventors: Robert J. Best; David H. Claybaugh, both of San Jose, Calif.

[73] Assignee: Worlds of Wonder, Inc., Fremont, Calif.

[21] Appl. No.: 98,784

[22] Filed: Sep. 21, 1987

Related U.S. Application Data

[63] Continuation of Ser. No. 636,683, Aug. 1, 1984, abandoned.

[51] Int. Cl.$^4$ ............................................... H04N 5/76
[52] U.S. Cl. .................................... 358/310; 358/335; 358/342; 360/19.1; 360/72.1; 360/11.1; 360/35.1; 364/521; 434/307; 434/308; 434/309

[58] Field of Search ............... 358/341, 343, 312, 903, 358/310, 335, 902, 93, 342; 340/706, 721, 734; 360/19.1, 72.1, 72.2, 10.1, 11.1, 37.1; 364/410, 521; 434/307, 308, 309, 315, 316, 321, 323, 335

[56] References Cited

U.S. PATENT DOCUMENTS 4,028,733  6/1977  Ulicki ................................ 360/35.1
4,422,105 12/1983  Rodesch ............................. 358/903

Primary Examiner—Robert L. Richardson
Attorney, Agent, or Firm—Blakely, Sokoloff, Taylor & Zafman

[57] ABSTRACT

An interactive video controller 10 for selecting between two or more tracks of video data responsive to the input of a player and for displaying the selected video track. The interactive video controller 10 displays and stores the selected track and then displays the stored track in place of the non-selected track.

48 Claims, 14 Drawing Sheets

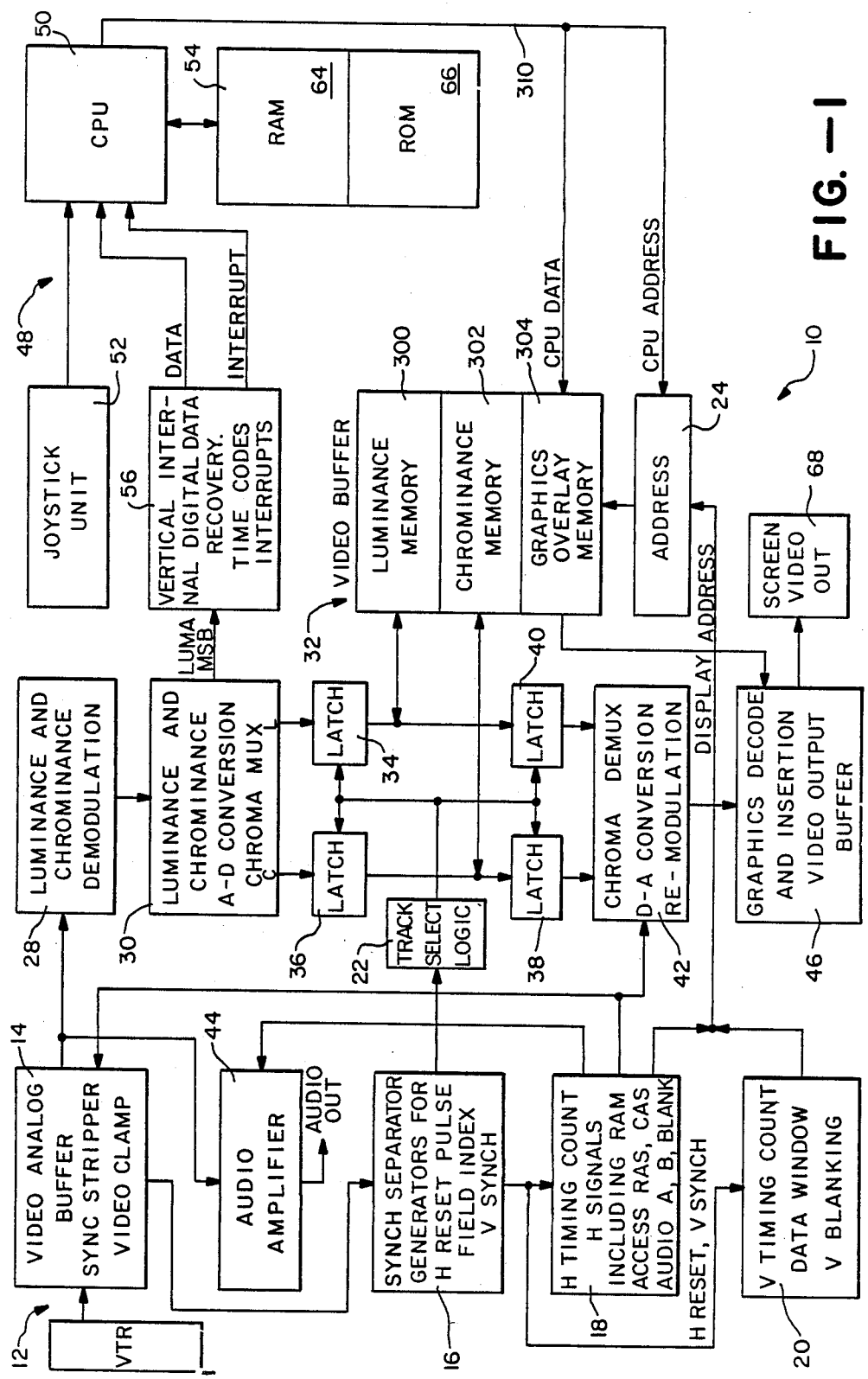

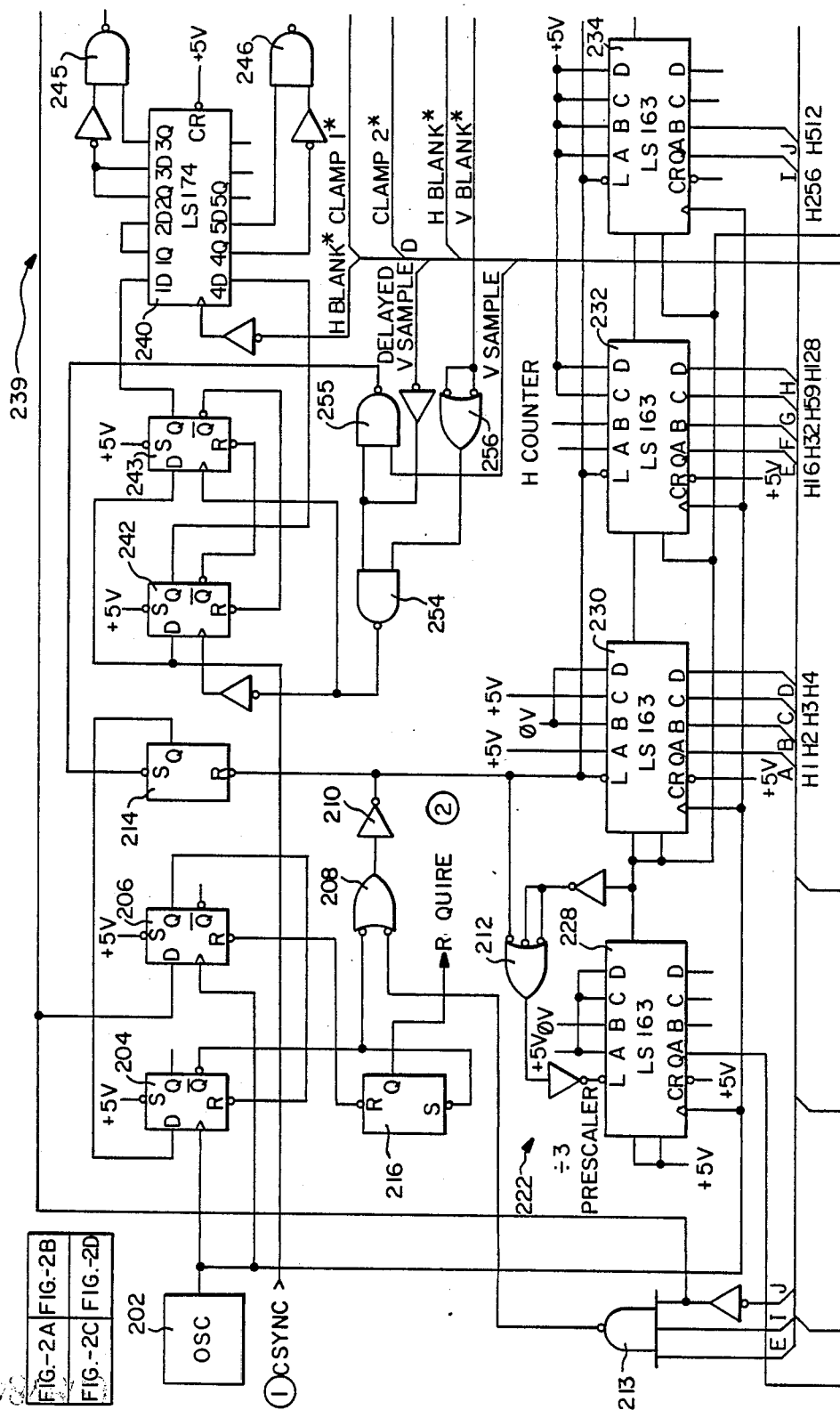
FIG.—2A

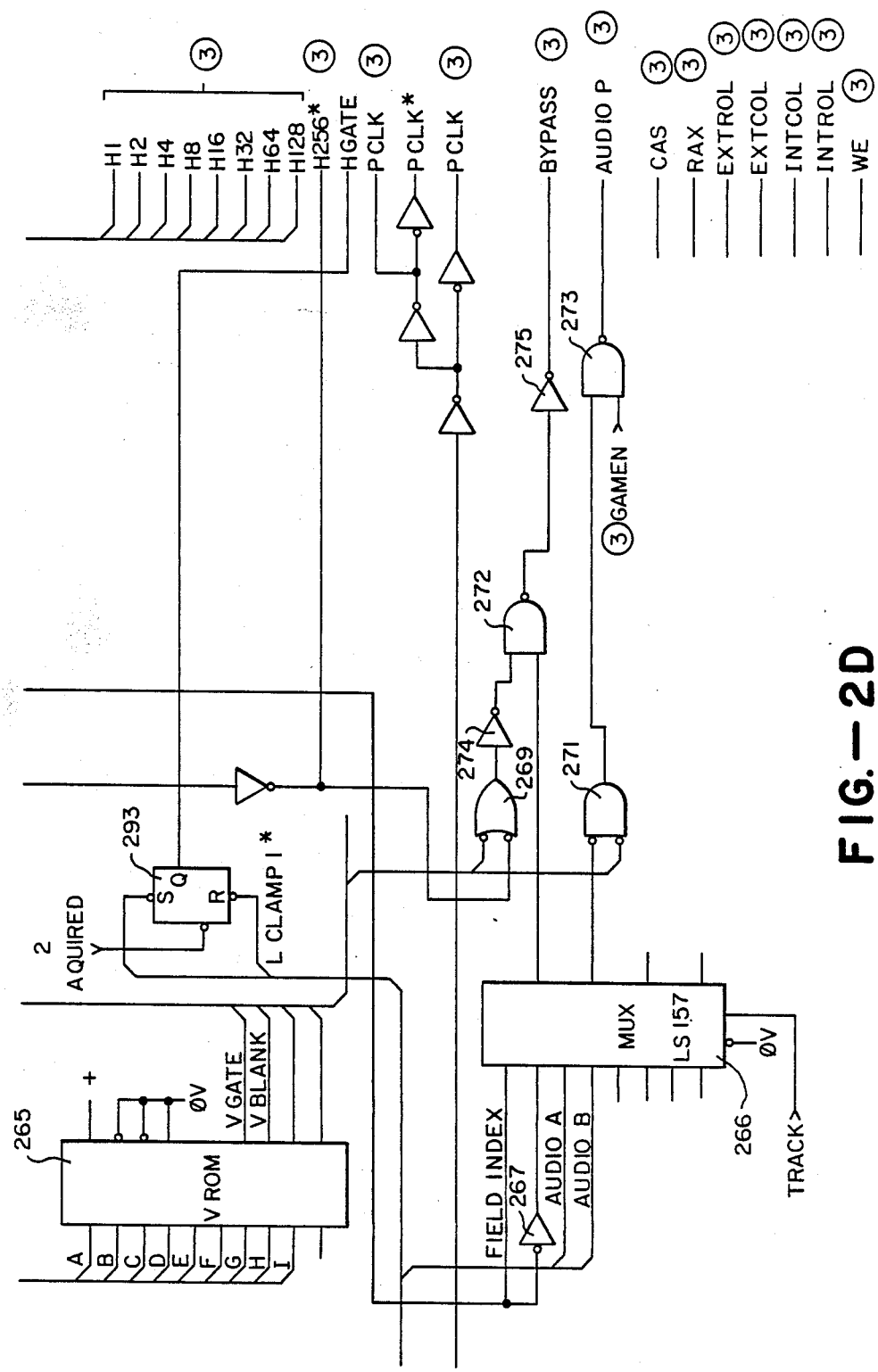
FIG.—2D

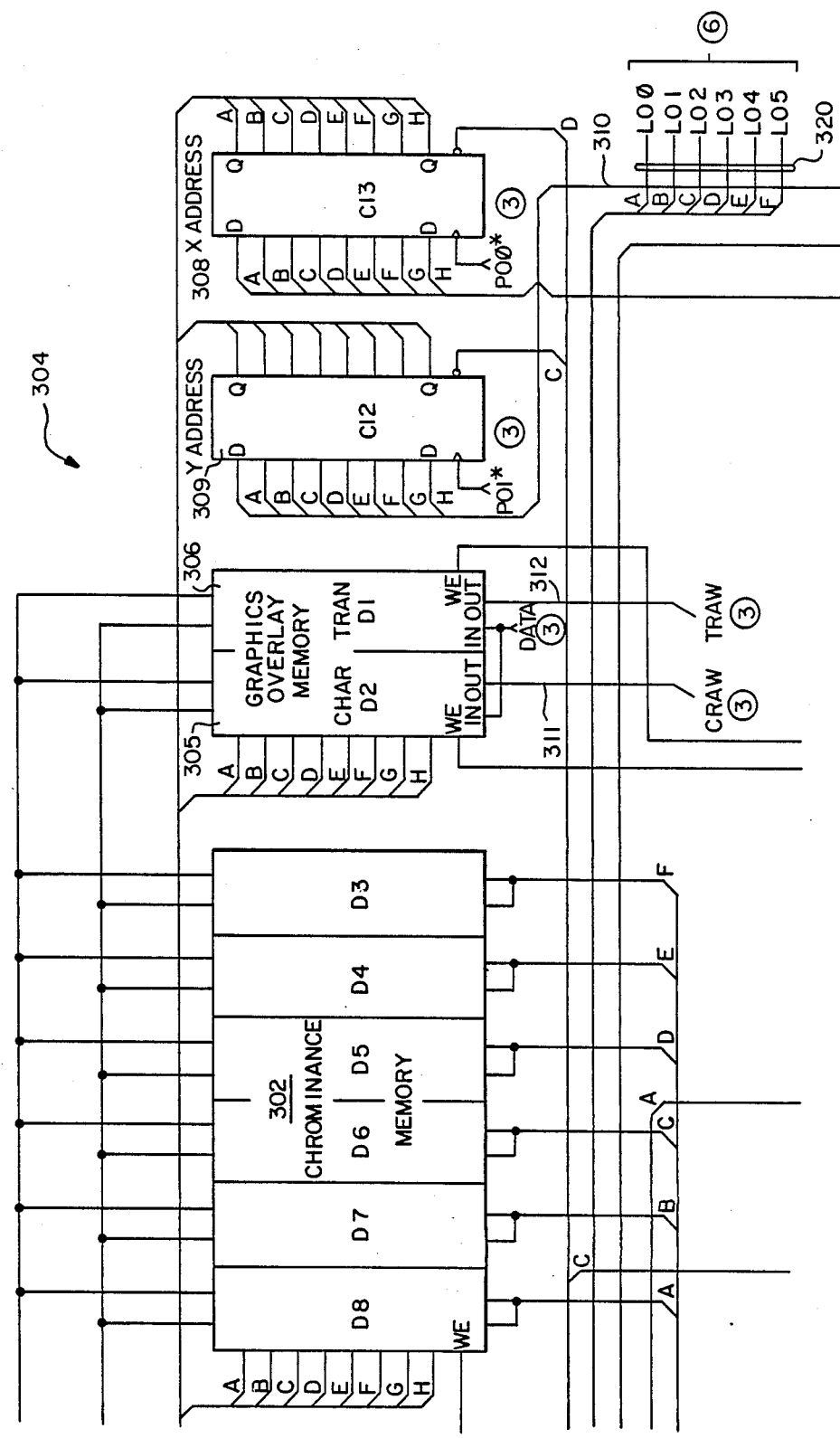
FIG.—3B

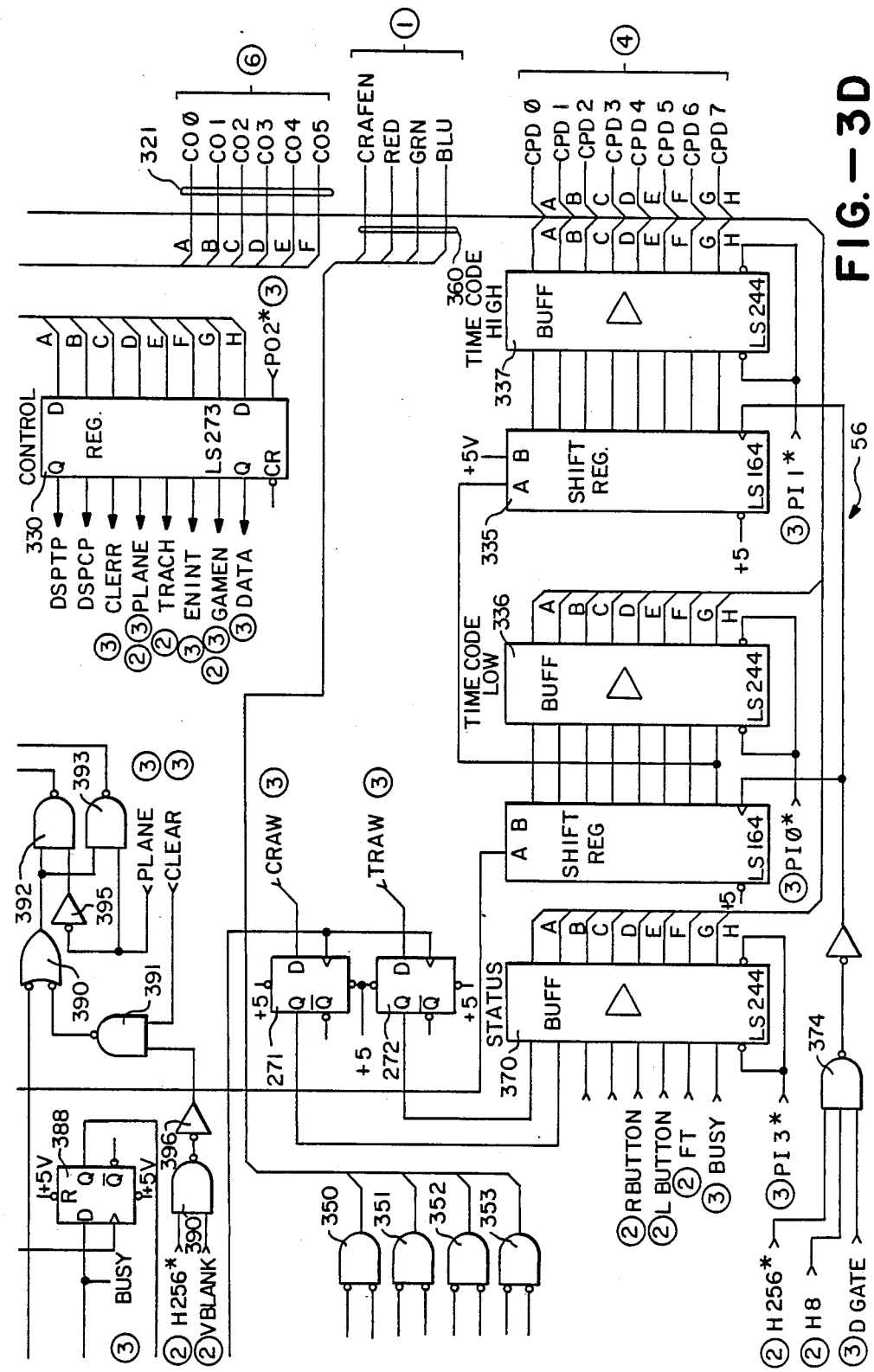
FIG.—3D

INTERACTIVE VIDEO AND AUDIO CONTROLLER

This is a continuation of application Ser. No. 636,683 filed Aug. 1, 1984 and now abandoned.

TECHNICAL FIELD

The present invention is related to interactive devices for allowing a user to selectively choose between several video and audio signals as can be supplied over the airways or telephone lines or through such devices as video tape recorders, video disc players and the like.

BACKGROUND OF THE INVENTION

With the revolution in data communication devices, additional attention is being focused on interactive communications in order to increase the efficiency of the data transfer process. This transfer process for interactive data communication can occur over airways, phone lines and the like and also from a resident data storage device. Interactive data communication is being successfully used or planned for such business enterprises as banking and catalog merchanidising, for such entertainment enterprises as video games, and for educational purposes.

There are presently being introduced into various commercial locations, kiosks which are essentially used as merchandising tools that include a sales catalog recorded on laser disc. A customer can view the video images of the items in the catalog and then select and purchase items by interacting with the communication mechanism of the kiosk. The purchaser could selectively view the catalog by making selections from an index or menu provided on the video screen. Such interactive merchandising is also contemplated on a large scale over the commercial airways through the use of home television sets.

Besides video and computer games, and merchandising applications, interactive communications devices are used for educational purposes in that they are able, on a real time basis, to teach a subject and/or provide a number of questions and score the results of the answers. By scoring the results of the answers, the interactive device is able to formulate further textual or graphic materials and/or questions according to the level of accomplishment of the individual.

The present state of the art is such that improvements still need to be accomplished in these interactive communication devices to make these devices even more interactive. One such improvement includes eliminating all time when the video screen is blanked or displays an intermission image, also known as dead time, while a search or access function is carried out to provide a response appropriate for the user's input. An additional improvement includes providing a plurality of tracks, channels, data files, or individual information modules in a format which maximizes the amount of information stored and minimizes the access time. Further, to be most useful these improvements need to be accomplished on presently existing data storage and display devises such as, for example, video tape recorder, in order to take advantage of the large installed base of such devices.

SUMMARY OF THE INVENTION

The present invention is directed toward providing an efficient and real time controller for interactive audio and video communication from a source signal. The present invention provides for an interactive controller which is adapted for use with source signals generated by present technology which has a large installed user base, as for example video tape recorders, which makes the user unaware of any search time and which provide for an efficient format for storing multiple channels or tracks of data.

It is to be understood that the source signal may also be generated off the airways, and by magnetic media played through appropriate devices, or from optical laser disc media played by a laser disc device. In addition, other devices and processes for providing an appropriate source signal for the interactive controller may be used.

While the present embodiment hereof contemplates the use of an existing and unmodified video tape recording and appropriate magnetic tape with appropriate video tracks provided thereon, other devices can be used to provide an appropriate signal. It is also to be understood that the interactive controller can be provided as an add-on unit to existing source signal producing devices such as, for example, existing video tape recorders, existing video disc players, existing video monitors and the like, or can be built into such devices.

The present invention solves the efficiency and real time problems inherent in the prior devices due to its unique signal formatting technique which allows for the interleaving of alternate video images. Essentially, an embodiment of the present invention provides for at least a first video track and a second video track and a device for selecting between the various tracks. The selected track is presented on a screen. Appropriate graphics and textual information, along with audio information, is provided on the tracks, and the graphics and textual material is output along with the video image with the audio information output over appropriate audio devices.

In one aspect of the invention, an interactive controller is provided for selecting between two or more tracks of video data contained on a video medium responsive to a player input, and for displaying the selected video track. The controller comprises a device for reading a video signal which is comprised of a series of interactive video fields. For a video signal comprised of two tracks, each track can be comprised of, for example first and second pluralities of alternating fields. For video signals comprised of N tracks, each track can be comprised of every Nth field in line of the signal.

The controller further includes a device responsive to the input of a player for selecting between the tracks provided on the source signal. The controller additionally includes a device for outputting the field related to the selected tract to a video screen and memory means for simultaneously storing the selected field. Further, a device is provided to output the stored field in substitution for the non-selected fields so that there is not interruption in this video presentation to the viewer. In addition this field store capability provides for the capability of freezing a selected field or picture on the video monitor.

It is to be understood that this present controller can be used with existing video tape recorders which play media organized as a series of frames, each frame including two fields and each field including 262½ horizontal scan lines. In the prior art, it is understood that each picture is provided by the interlacing of the horizontal scan lines of the first and second field to provide a complete picture. With the present invention, each of successive fields are used for separate tracks which provides a separate and distinct picture with the memory device providing a copy of the selected field in substitution for the next successive non-selected field in line on the tape medium. For media which has more than two tracks the frame format would be inappropriate.

In another aspect of the invention, means are provided for efficiently separating the luminance and chrominance signals from the video signal and digitizing these signals so that they may be stored in a memory device. Additionally, means are provided for converting the luminance and chrominance signals to analog signals prior to their being presented to the video monitor.

Other advantages and aspects of the invention are detailed below.

BRIEF DESCRIPTION OF THE FIGURES

FIG. 1 is a block diagram of the interactive controller of an embodiment of the invention.

FIGS. 2A-2D are schematic views of part of the digital timing circuitry of the embodiment of FIG. 1.

FIGS. 3A-3D are schematic views of part of the digital video buffer, address registers, and related digital circuitry of the embodiment of FIG. 1.

DETAILED DESCRIPTION OF THE PREFERRED EMBODIMENT

Figure 2B:
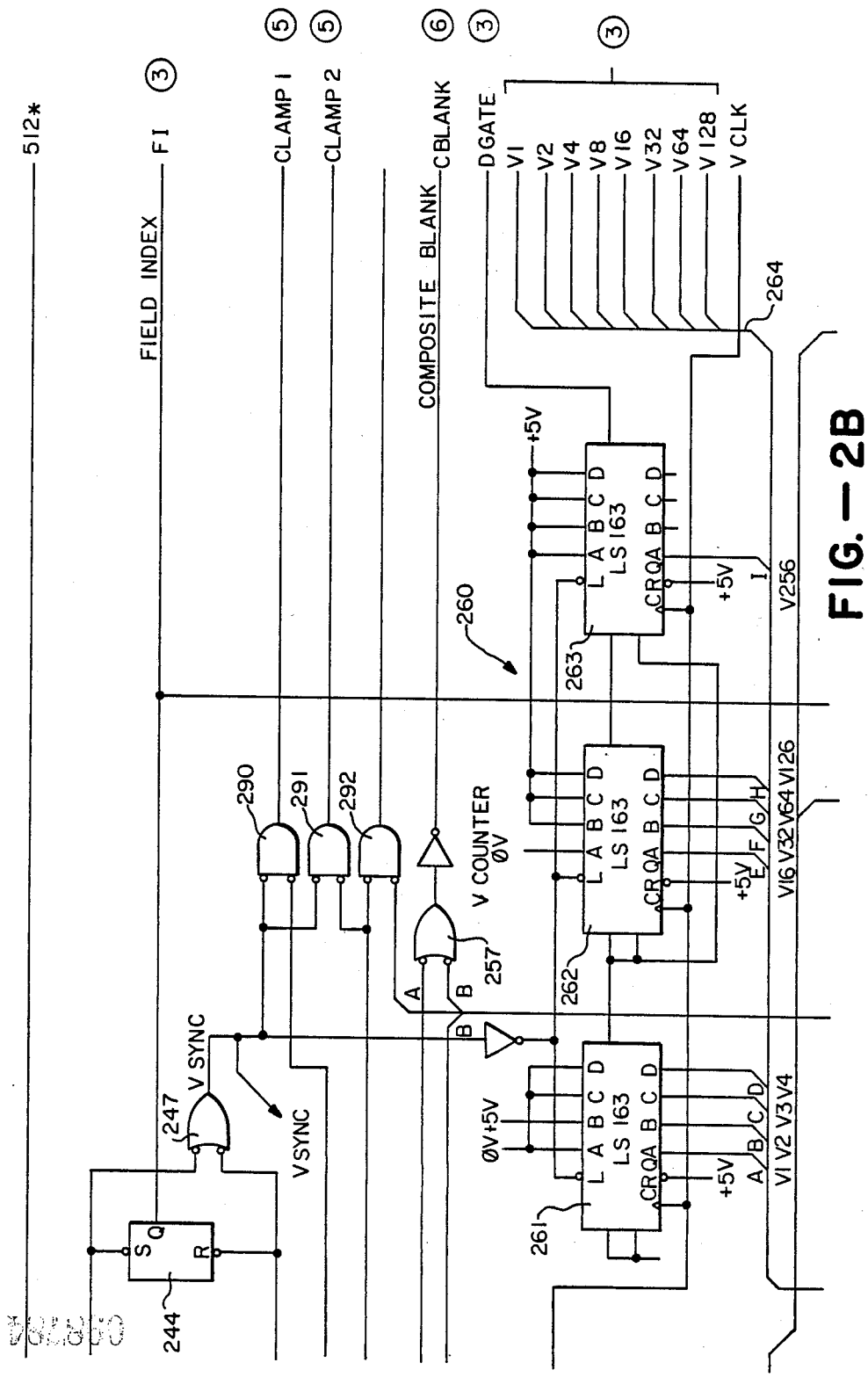

With reference to the figures, and in particular, FIG. 1, the interactive video and audio controller 10 of the invention is depicted. The controller 10 includes a synchronization unit 12 composed of blocks 14, 16, 18, 20 and 22, a video buffer unit 26 composed of blocks 28, 30, 32, 34, 36, 38, 40, 42, an audio output unit 44, a video output unit 46 and a microprocessor unit 48 comprised of blocks 50, 52, 54, 56. The interactive controller 10 can interactively process a video and/or audio signal stored on a medium such as, for example, video tape or a video disk or other magnetic or optical media, responsive to the input to the controller 10 provided by, for example, a transducer such as the joystick unit of Block 52.

It is to be understood that an appropriate signal transmitted such as a television signal can be used without the need for locally based media. It is further to be understood that the present preferred embodiment contemplates an add-on controller 10 to an existing video tape recorder, but that built-in controllers for video tape recorders and add-on and built-in controllers for other devices which produce the appropriate input signal are within the scope of this invention. Considering the present embodiment, the video and/or audio medium as used on a video tape recorder has provided thereon multiple tracks for storing multiple answers, or story lines or educational, entertainment or business information and data. The selection between the choices provided on the video medium is made by microprocessor unit 48 either by input from the joystick unit 52 thereof or as a result of script instruction, such as for example a graphics request signal for requesting a graphics utility stored in microprocessor unit 48 provided on the media as will be explained below. The controller 10 accomplishes selection by storing and playing various portions of the information and data provided on the medium. The present embodiment can store video fields for playing out as required.

In a preferred embodiment, the information and data are stored on video tape as a series of fields. Using conventional television terminology, a single picture or frame is comprised of two fields which have $262\frac{1}{2}$ horizontal or scan field lines for a total single picture or single frame of 525 horizontal or scan field lines. A first field is scanned across a television screen and then a second field is interlacingly scanned across the screen to produce a single picture. In this embodiment, however, a first field comprises one answer or story line, and a second field comprises a second anser or story line. The selected answer or story line and thus the selected field is displayed on the screen 68 and simultaneously stored in the video buffer 32 and also subsequently output in place of the non-selected field which represents the other answer or story line so that there is no discontinuity in the output picture. As explained below, for a plurality of answers or story lines, a plurality of interleaved fields can be used. For example a first field can have one story line, a second successive field can have a second story line, a third successive field can have a third story, and a fourth successive field story. Accordingly, for a signal of four story lines the fifth field has data for the first story line. It is to be understood that interleaving can also be accomplished by single or multiple frames as well as field by field. Additionally, it is to be understood that the horizontal scan lines of each field can be interleaved.

Figure 8:
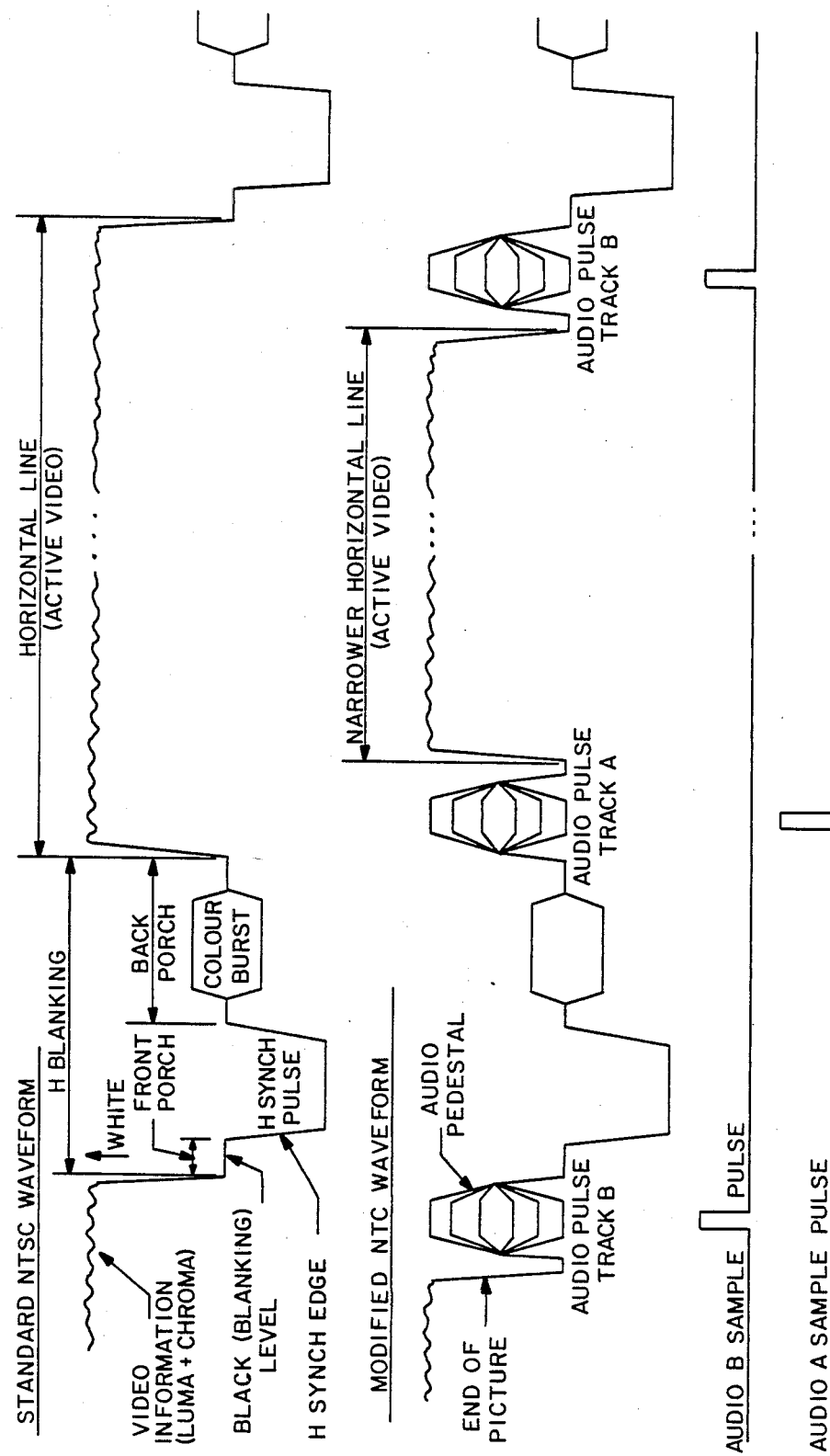
FIG. 8 is a waveform signal diagram for the input signal to the embodiment of FIG. 1.

FIG. 8 depicts a standard NTSC waveform and a modified waveform to be used with the controller 10 and which comprises part of the invention. It is to be noted that the horizontal line where active video information is stored has been narrowed in favor of sound pulses for audio track A and audio track B. Additional audio tracks can also be added in a similar manner. It is to be further understood that the horizontal lines at the beginning of each frame which do not appear on the video screen can be used to store programming information and instructions such as graphics request signals, joystick test signals, change tract signals, and many more.

Synchronization Unit

Figure 5:
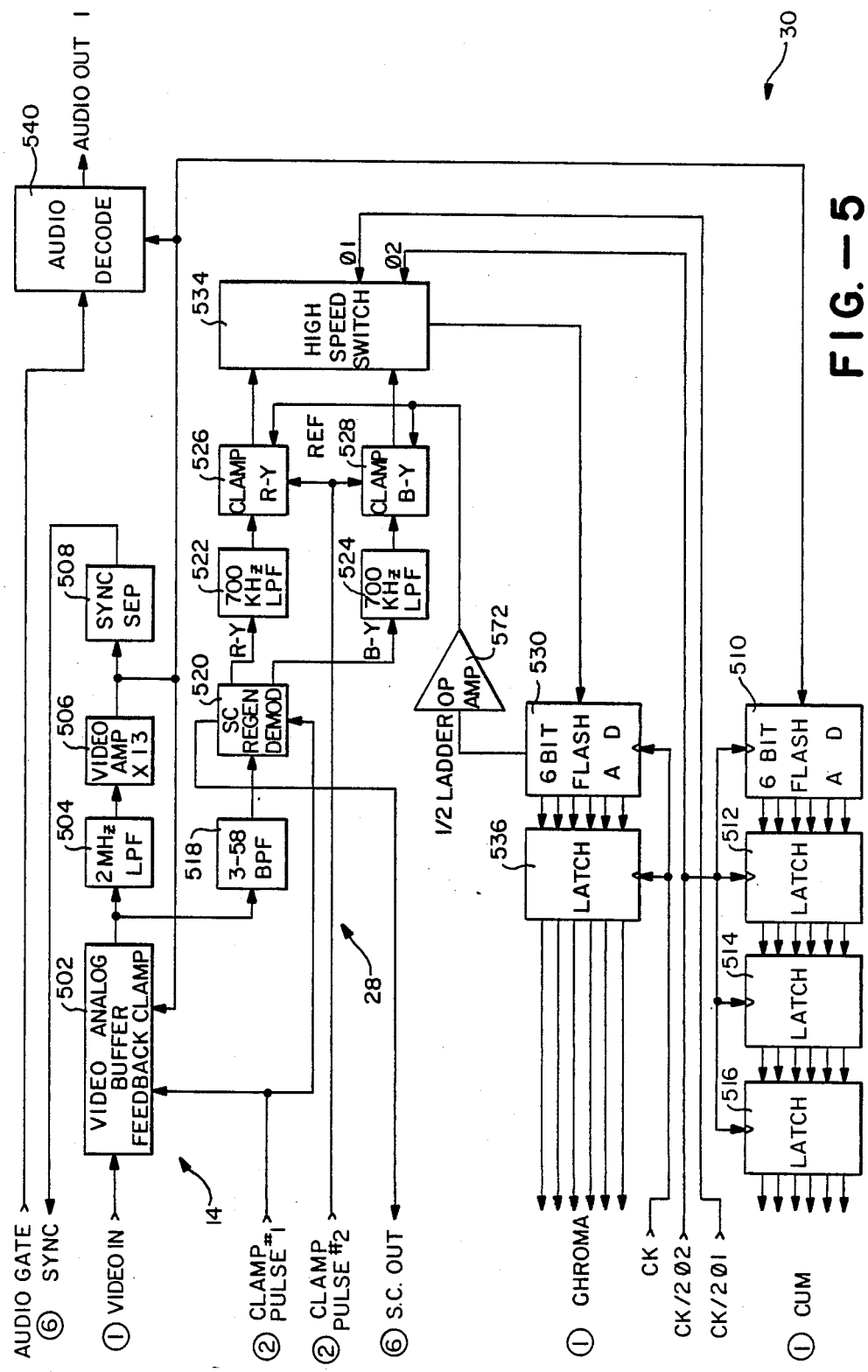
FIG. 5 is a block diagram of part of the analog video buffer and the analog to digital conversion circuitry of the embodiment of the invention of FIG. 1.

Referring to FIG. 1, block 14 of synchronization unit 12 includes a video analog buffer and feedback clamp 502 (FIG. 5) and a synchronization stripper 508 (FIG. 5). Block 14 takes the incoming video analog signals which have audio information multiplexed thereon, and passes these signals through amplifiers and filters to strip off the composite synchronization and to clamp the video levels to stabilize the black video level. Further details of these devices are provided below with a discussion of FIG. 5.

The output from block 14 is provided to blocks 16, 28, 44. Block 16 (FIG. 1) provides for a synchronization separation, for horizontal reset pulse generation, field index generation and vertical synchronization pulse generation (FIG. 2).

Figure 2C:
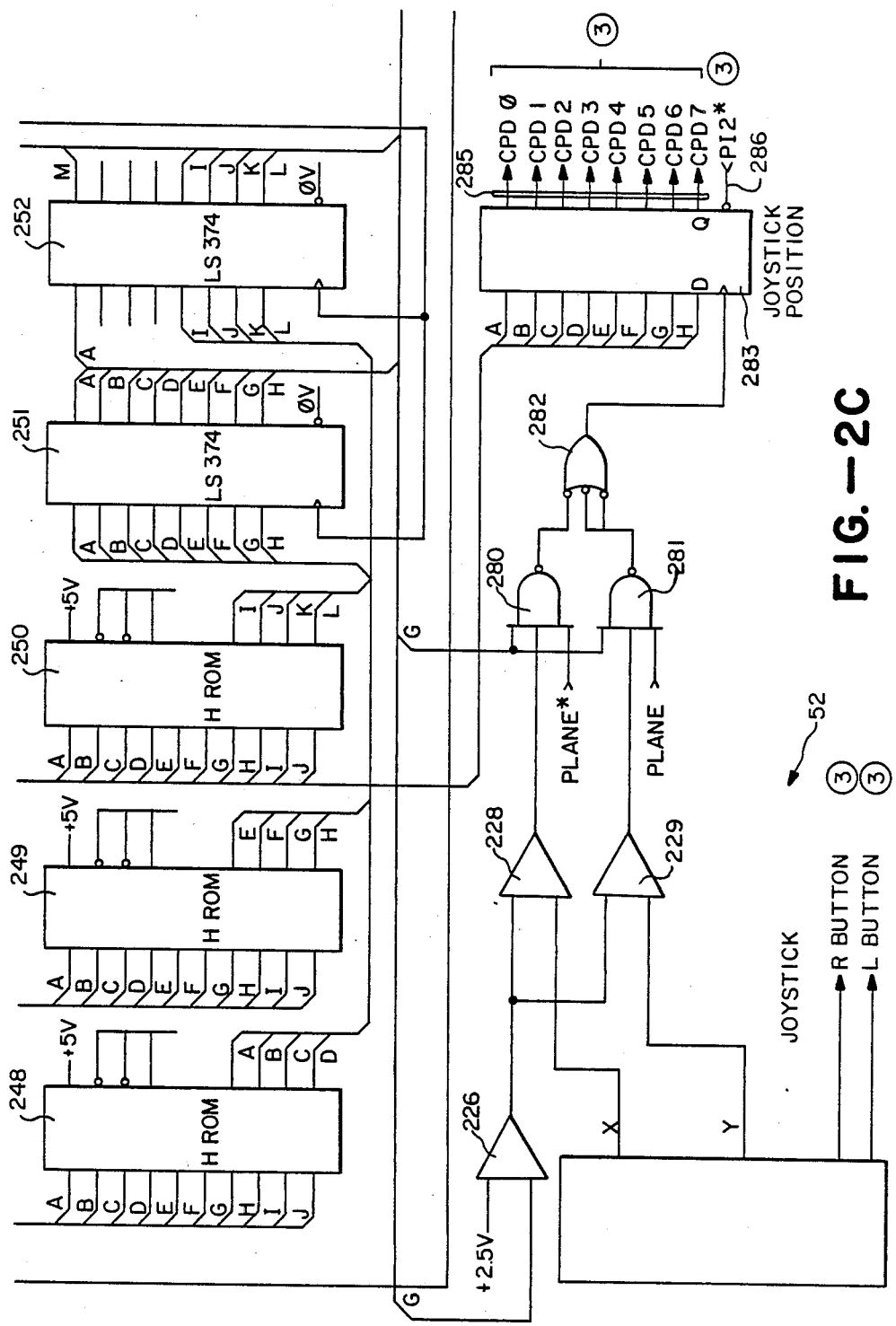

As can be seen in the upper left portion of FIG. 2, clocking is provided by a 14.318 MHz oscillator 202. This clocking is provided to Flip Flops 204, 206 which, in connection with Flip Flops 214, 216 and surrounding OR-gates 208, 212, NAND gate 213, and inverter 208, provides a reference pulse or reset pulse for the start of the horizontal video scan line. Synchronization is accomplished by the above circuit as follows. The starting condition is with the Q input equal to one (ie high) for FLIP FLOP 214. Accordingly, this input D of latch 204 is equal to one (ie high). The leading edge of HSYNCH (explained below) which is contained within CSYNCH (explained below) clocks FLIP FLOP 204 so that the output of FLIP FLOP 204 is zero. This signal passes through OR-gate 208 and inverter 210 and resets FLIP FLOP 214, thus setting this input to D of FLIP FLOP 204 equivalent to zero. This renders FLIP FLOP 204 unreceptive to further CSYNCH transitions. The same signal that resets FLIP FLOP 214 provides load signal to a horizontal counter chain 222 which is comprised, in a preferred embodiment, of synchronous four bit counter 228, 230, 232, 234. This signal causes a synchronous load of the binary value −44 (see horizontal line position scale in FIG. 7) into counter 230, 232 and 234 and sets counter 228, through a divide-by-three prescriber to an initialized value. The H512 signal (signal J output of counter 234) goes high as a result and is inverted (and redesigned 512*) and applied to the D input of FLIP FLOP 206 and resets FLIP FLOP 204. Thus the output of FLIP FLOP 204 ($\overline{Q}$) is a reset pulse of duration not less than one clock period even though CSYNC is asynchronous to the clock. FLIP FLOP 214 which stays reset until the latter part of the horizontal period, prevents the circuit from responding to the horizontal pulsers in the vertical interval. This function is augmented by the decoding circuit including NAND gate 213 which, if a valid HSYNC edge is not received when the horizontal counter chain 222 is at a nominal count of 258 (then being loaded with the count −44 to give a nominal horizontal period of 258+44=302) clocks detects that the horizontal counter chain 222 has overrun to a count of 272 and automatically issues a $\overline{LOAD}$ pulse. This simulates a late HSYNC edge and causes the Horizontal counter chain 222 to go to the next HSYNC edge. NAND gate 255 (described below) provides this signal which sets FLIP FLOP 214, and hence FLIP FLOP 204 to look for the next HSYNC pulse.

The horizontal counter chain 222 which, among other things, provides addresses for addressing the video buffer 32 by line 253, as will be described below, also supplies horizontal counter pulses to memory chips or horizontal ROMs (HROM) 248, 249, 250. It is noted that the numbers provided in the left and right margins of the figures adjacent the signal lines and throughout the figures adjacent signal lines identify the figures to which the signal on that particular line is provided. The output from HROMs 248, 249, 250 is provided to latches 251, 252. The latches 251, 252 serve to time synchronize the output of the HROMs as they are clocked by ripple carry output of counter 228.

Figure 7:
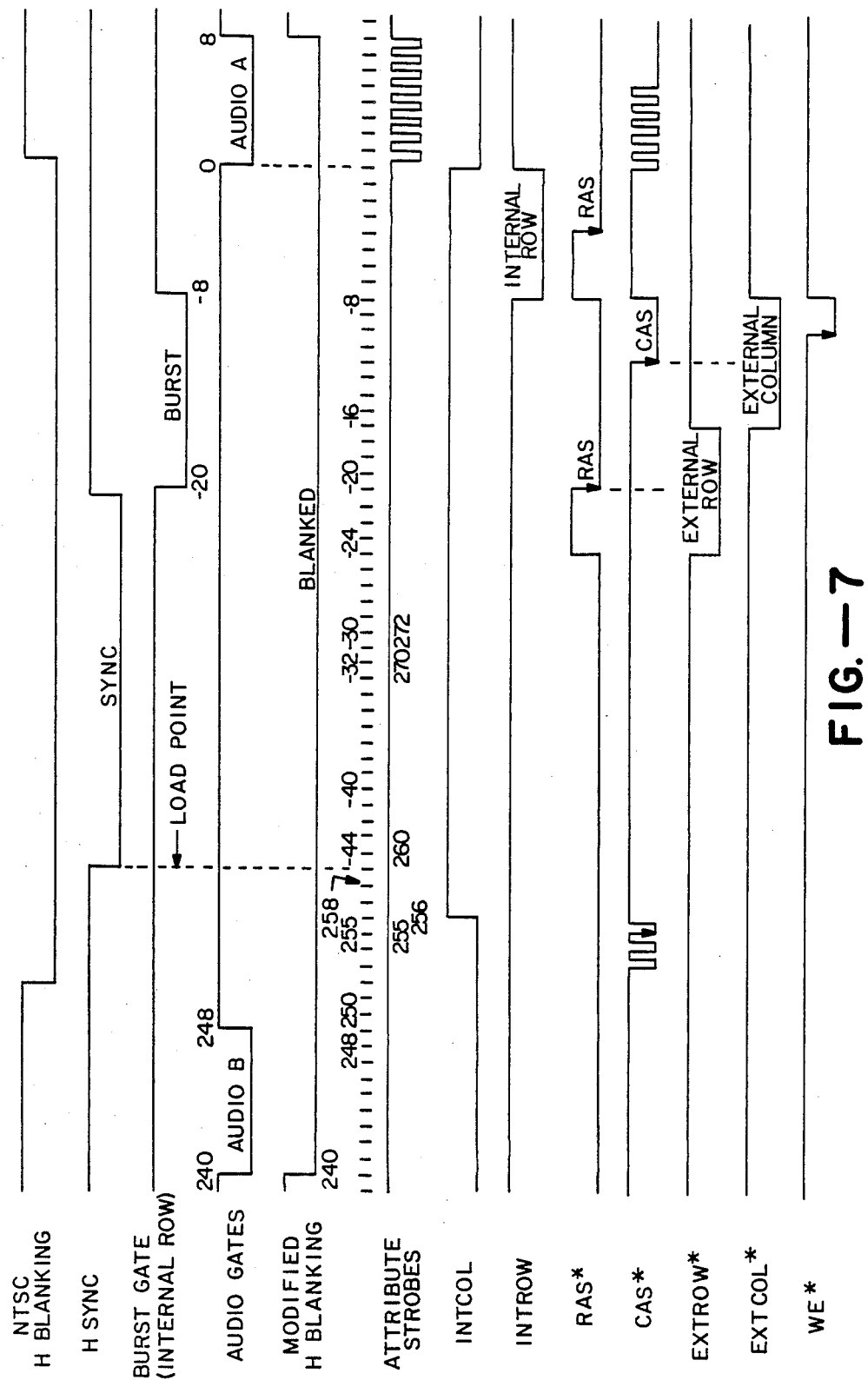
FIG. 7 is a waveform diagram for the embodiment of FIG. 1.

In HROMs 248, 249, 250 (Block 18, FIG. 1) is stored a series of timing tracks related to the horizontal interval. The output of the HROMS 248, 249, 250 is provided through latches 251, 252 to the synchronization separating circuitry 239. These signals are used for the synchronization separation process. In FIG. 7 an idealized version of a horizontal interval blanking pulse is depicted along with a modified horizontal interval blanking pulse used in this embodiment. The signals from HROMs 248, 249, 250 include row access strobe (RAS), column access strobe (CAS), write enable (WE), internal column (INTCOL), internal row (INTROW), external column (EXTCOL) and external row (EXTROW), all of which provide access signals for video buffer 32. Also depicted are a color burst gating pulse and an two audio gating pulses which are generated by the HROMs. The waveform INTCOL, INTROW, RAS, CAS, EXTROW, EXTCOL and WE are instrumental in the selection of data to be presented on the screen. These signals are keyed to the horizontal line position shown in the center of the timing waveforms depicted in FIG. 7. Additionally HROMs 248, 249, 250 generate a V sample strobe (FIG. 2) and clamp pulses (FIG. 5). In this embodiment and as indicated above, the leading edge of the horizontal synchronization pulse (HSYNC, FIG. 7) on the incoming signal resets the horizontal counter chain 222 to a preset code of −44. The horizontal counter chain 222 then counts up to the value of 8 counts past zero (FIG. 7) at which point the left-hand edge of the picture starts. The chain 222 counts until the count 240 is reached when the picture is blanked again. Thus count 8 is the leading edge of the picture and count 240 is the trailing edge of the picture. This defines the modified horizontal blanking signal of this embodiment (FIG. 7). This produces a narrower picture width than is normal on a standard television screen. The normal picture as provided by the NTSC horizontal blanking signal would be approximately from the count of zero to the cunt of 248 (FIG. 7).

Hex Flip Flop integrated circuit 240 of synchronization separation circuitry 239, along with Flip Flops 242, 243, 244, NAND-gates 245, 246, 254, 255, OR gate 247, 256, 257 and AND-gates 290, 291, 292 receive a composite synchronization signal (CSYNC) from the video tape recorder and also VSAMPLE, modified HBLANK*, CLAMP 1*, CLAMP2* from the HROMs 248, 249, 250, and VBLANK* from VROM 265 (described below). The Flip Flop 244 outputs a FIELD INDEX signal. The FIELD INDEX signal identifies the field. It is low during the first field and high during the second field and changes at a point just after the vertical synchronization signal. The vertical synchronization signal (VSYNC) is separated from CSYNC by Hex Flip Flop 240, NAND gate 245, 246 and OR gate 247. This VSYNC signal causes the vertical counter chain 260 (described below) to be loaded with a preset negative value. CLAMP1* and VSYNC inputs are provided to AND gate 290 which outputs a CLAMP1 signal. CLAMP2* and VSYNC inputs are provided to AND gate 291 which outputs a CLAMP2 signal. HBLANK* and VBLANK* are provided to OR gate 252 which outputs a composite blanking signal (CBLANK).

For the synchronization separation circuitry 239, samples of CSYNC are clocked into FLIP FLOPS 242, 243. Which even FLIP FLOP 242, 243 sees the VSYNC portion of CSYNC change first is set and the other FLIP FLOP is put into reset. The above clock signals to FLIP FLOP 242, 243 are true and false versions of DELAYED VSAMPLE produced by NAND-gate 254.

FLIP FLOP integrated circuit 240 is used as a pair of shift registers and is clocked by HBLANK*. This synchronizes the output of FLIP FLOP 242, or FLIP FLOP 243 to the next edge of the HBLANK* signal. NAND-gates 245,246 produce a pulse from this leading edge of the detected VSYNC, which sets or clear FLIP FLOP 244 tp produce the Field Index signal described above.

The vertical counter chain 260 (FIG. 2) is comprised of three synchronous four-bit counters 261, 262, 263 which are loaded with a preselected count when a load signal (V SYNCH) is given from OR gate 247 and which are clocked by a signal from inverter 210 which also clocks the horizontal chain counter 222. The output from vertical counter chain 260 is provided to output line 264 and provided therefrom to vertical address latch 317 (FIG. 3) for the video buffer 32. The vertical counter chain 260 counts down from the vertical synchronization interval and handles such timing functions as the location of the horizontal scan lines including the horizontal scan lines which are in the blanked portion of the top of the picture and which contain a digital instructions and program (referred to above with respect to FIG. 8). The vertical counter chain 260 determines the horizontal start and the end lines of the picture. Additionally the output of the vertical counter chain 260 addresses the vertical ROM (VROM) 265. Signals output from the VROM 265 include vertical interval gate (VGate) and vertical interval blanking (VBlank). The VGATE signal gate off the audio sample pulses during VSYNC switching for noise suppression. The VBLANK signal is a standard vertical blanking signal for picture blanking.

In FIG. 2 a quadruple 2 to 1 multiplexer 266 is located immediately below VROM 265. Multiplexer 266 receives a FIELD INDEX signal generated from Flip Flop 244 and an inverted FIELD INDEX signal from inverter 267. Additionally, multiplexer receiver an AUDIO A and an AUDIO B recovery pulses or audio gates (FIG. 7) from latches 251, 252 provided from HROMs 248, 249, 250. A TRACK signal provided to multiplexer 266 controls the switching between AUDIO A and AUDIO B recovery pulses and the inverted FIELD INDEX signals. Track is an output from a control register 330 (FIG. 3) of the microprocessor unit 48 which accomplishes this switching responsive to which field is selected by the joystick unit 52.

The output of multiplexer 266 is provided to logic circuitry 268 (track select logic, Block 22, FIG. 1) which is comprised of OR gate 269, AND gate 271, NAND gates 272, 273 and inverters 274, 275 and which output signals BYPASS and AUDIOP. The BYPASS signal relates to whether the digital field is in the direct-through mode (passing directly from latches 34, 36 to latches 38, 40, FIG. 1) or the playback mode (played from video buffer 32). A high BYPASS signal indicates the use of the direct-through mode.

From multiplexer 266 the FIELD INDEX signal or the inverted FIELD INDEX signal depending on the TRACK signal is provided to and AND gate 272 along with an inverted signal from OR gate 269. OR gate 269 is provided with the VGATE signal from VROM 265 and a horizontal count signal from horizontal counter chain 222. These signals determine the BYPASS signal.

The selection by multiplexer 266 between the AUDIO A and the AUDIO B recovery pulse is also made by the TRACK signal which depends on the joystick unit 52 input, and is provided to AND gate 271 along with the VGATE signal from VROM 265. The signal from AND gate 271 is provided to AND gate 273 which provides an output signal Audio P depending on the second input game enable signal (GAMEN). GAMEN is a bit set in the control latch 330 (FIG. 3) by the microprocessor unit 48. The GAMEN pulse blanks both the audio and the video signal (described below) under command of the microprocessor unit 48 at such time as the initial tape lead in and also as part of the game function when the microprocessor unit 48 can lock out the game and force the player to return to the start of the game for, for example, nongame play for a specified period of time or failure to obtain a correct answer after a specified number of attempts.

The joystick unit 52 of FIG. 1 is shown in greater detail on the lower left-hand corner of FIG. 2. The joystick unit includes opertational amplifier 276, comparators 278 and 279, AND-gates 280 and 281, OR gate 282, octal latch 283 and joystick 284. The function of the circuit is to provide a linear sawtooth waveform whose period is equal to the horizontal period of the horizontal scan line. The sawtooth waveform is reset by the signal which is given by the label G, which is the horizontal blanking interval provided by the HROMs 248, 249, 250. The sawtooth waveform starts at the left side of the picture, increases in value, and finishes at the right side of the picture. It is applied to the two comparators 278 and 279.

The other inputs to the comparators 278 and 279 are the outputs from potentiometers (not shown) provided in the joystick 284 which will provide the x and y positions of joystick 284. The output from the joystick in the x and y directions is compared with the sawtooth waveform in comparators 278 and 279 respectively. Depending on the input signals, the outputs from comparators 278, 279 change states in a digital manner providing a pulse edge which is sent to the subsequent NAND gate 280, 281. NAND-gates 280, 281 are, in addition, provided with signal G from the HROMs 248, 249, 250 and with a signal PLANE* in the case of NAND gate 280 and PLANE in the case of AND gate 281. It is to be noted that a signal followed by a superscript * is used to indicate the not or inverted condition for that signal.

The PLANE signal is from the control register 330 (FIG. 3) of the microprocessor unit 48. The purpose of the signal is to select between the x and the y signal from the joystick 284. The two signals from the NAND gates 280, 281 are merged by OR gate 282 and output from OR gate 282 so that there is a sharp transition point. The transition point provides a high state at some point along the horizontal scan line where the ascending sawtooth waveform intersects the voltage coming off of the x and y leads from the joystick potentiometers contained in joystick 284 as determined by comparators 278, 279. Accordingly the joystick unit 52 has converted the joystick levels into a time pulse relating to the position of the joystick along and relative to the horizontal scan line presented on the screen.

Figure 3A:
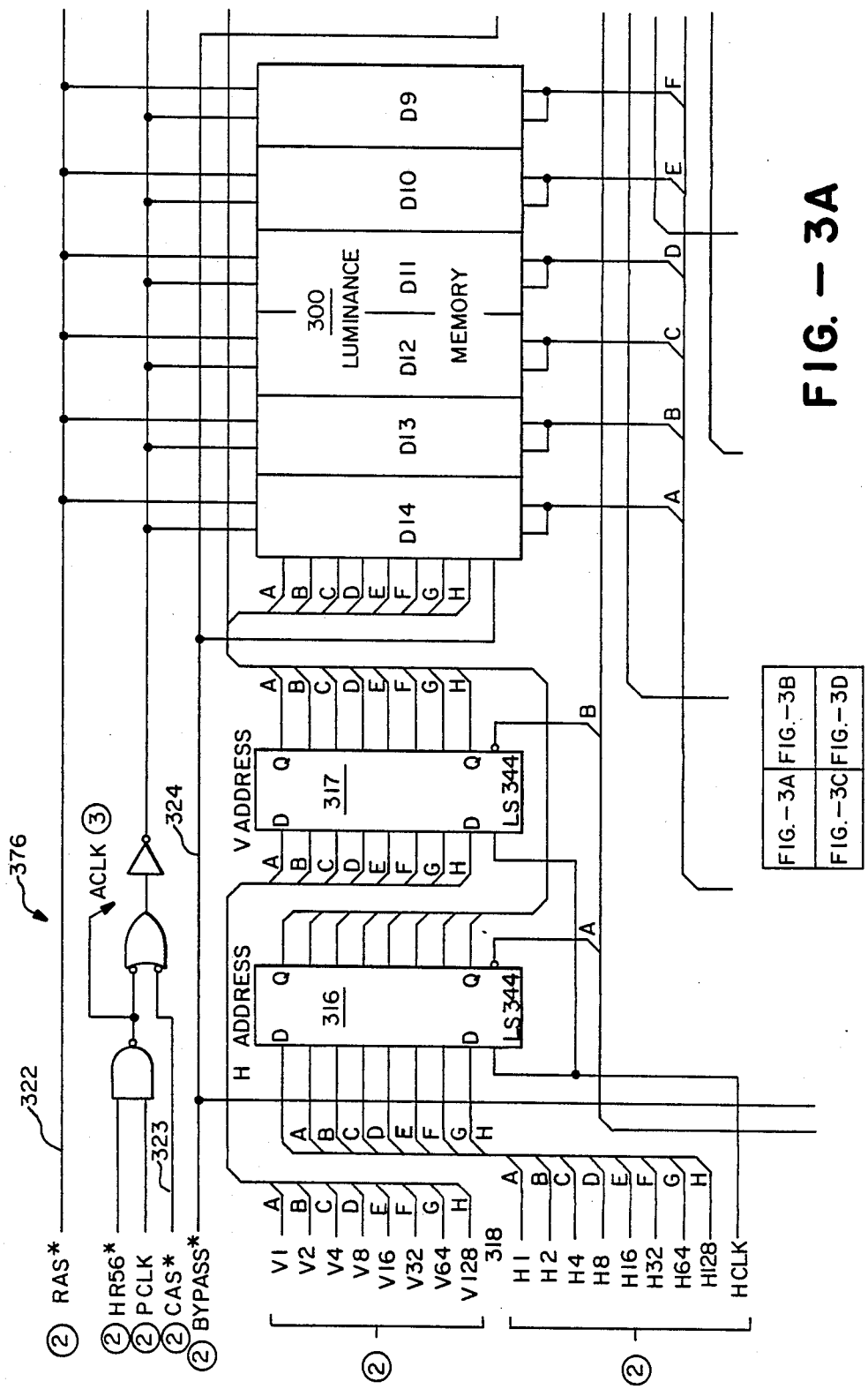
Figure 3C:
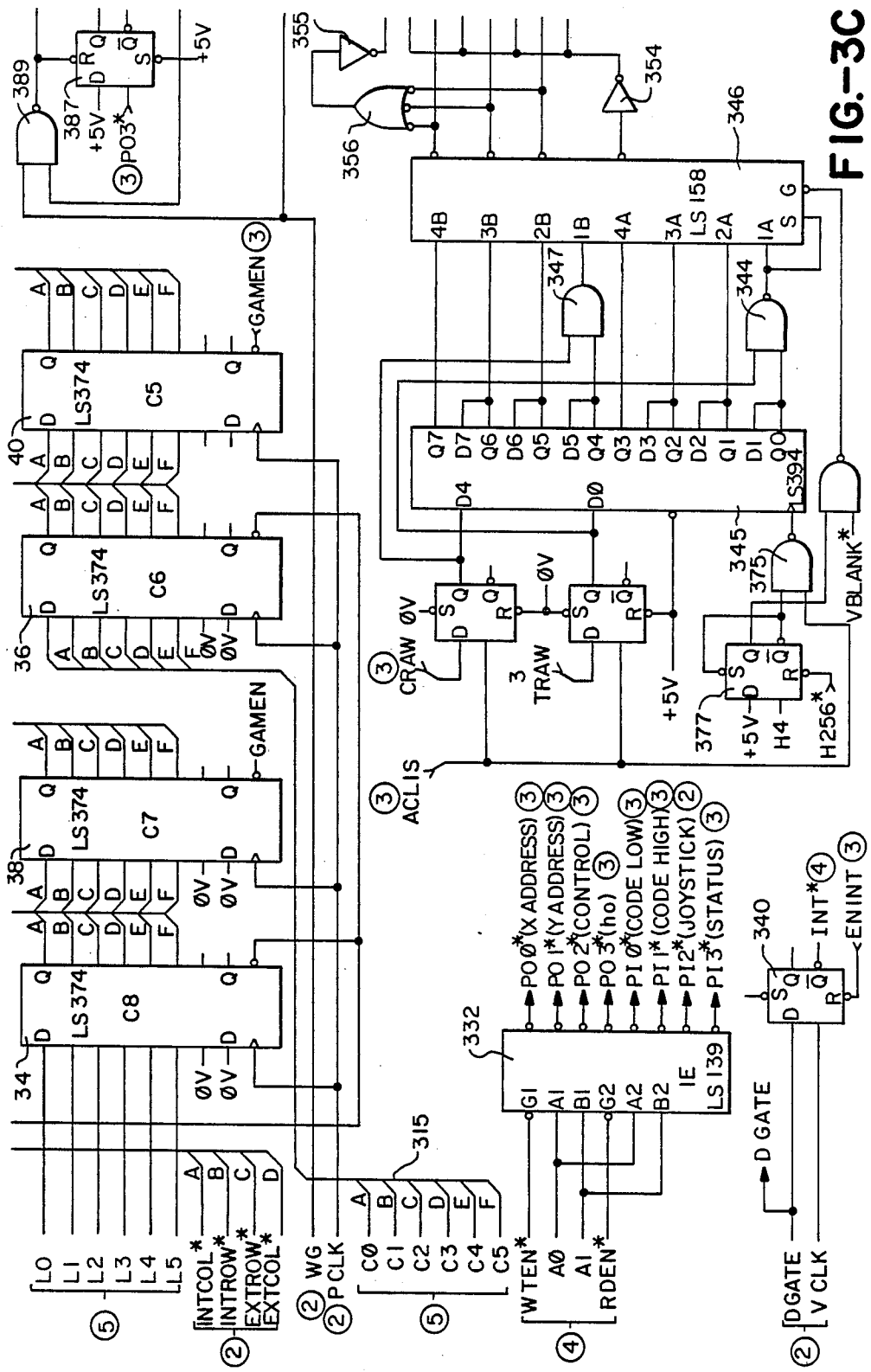
Figure 4:
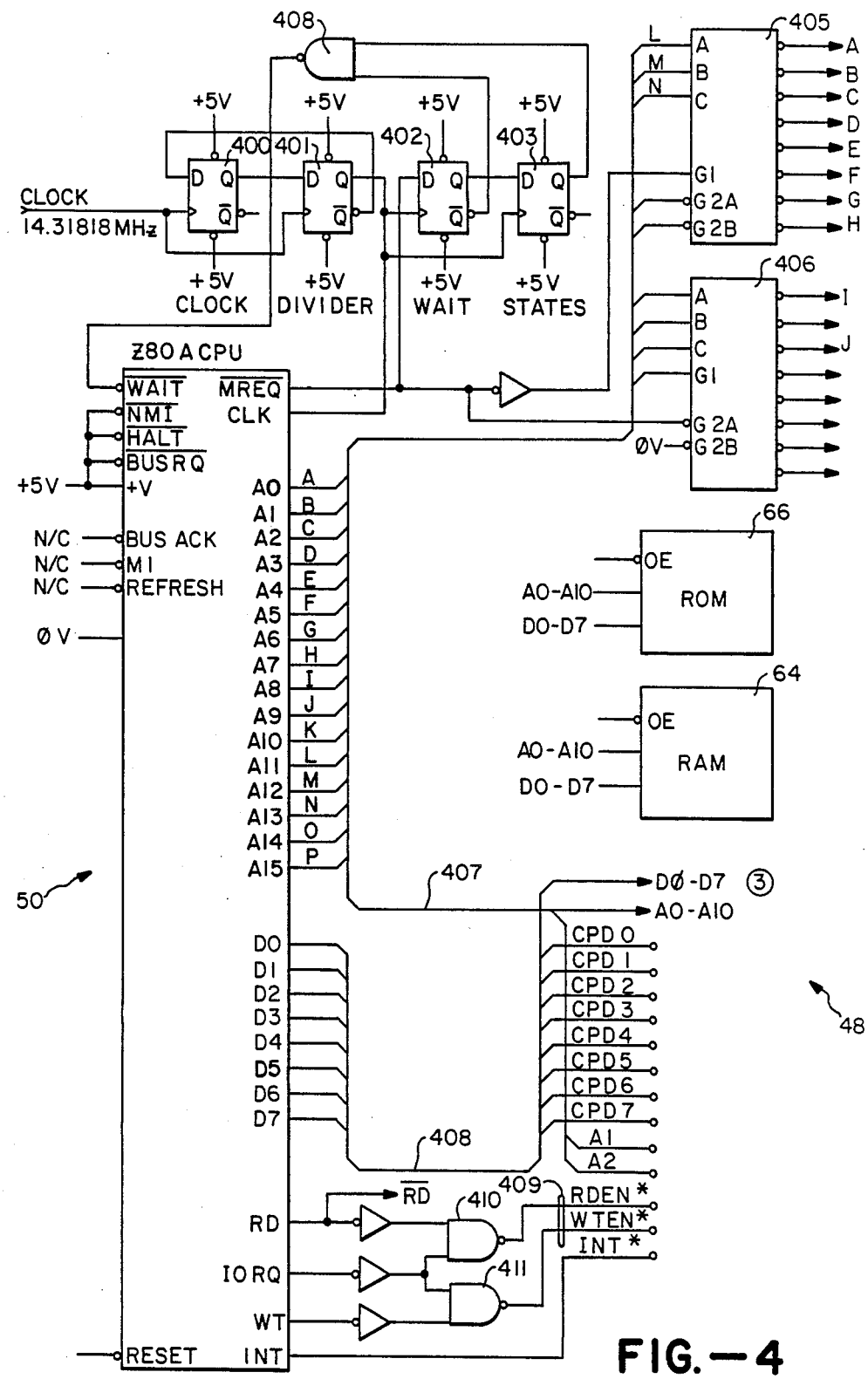
FIG. 4 is a schematic view of the microprocessor unit of the digital circuitry of the embodiment of FIG. 1.

This pulse is used as a clock pulse into an octal latch 283, the inputs to which are the counts from the horizontal counter chain 222. Accordingly, the current horizontal count value which represents the joystick position is latched into octal latch 283. The joystick position is output on lines 285 and is provided bidirection bus 310 (FIG. 3) and microprocessor unit 48 (FIGS. 1, 4). The horizontal count value basically climbs from a value of 0 to a value of 255 as the horizontal scan line proceeds across the screen. The captured horizontal count number, which is proportional to the offset of the joystick, can then be read as the joystick position by the microprocessor using a decoded strobe signal PI$_2$* from I/O port decoder 332 (FIG. 3) on line 286. Thus the above joystick interface 48 provides for simple method of multiplexing two joystick voltage outputs and capturing a conveniently available numerical value for the joystick position.

Video Buffer Unit

The luminance and chrominance memories 300, 302 store the luminance and chrominance signals from the field selected to be viewed. The video signal is provided through Block 14 (FIG. 1) to luminance and chrominance demodulator, Block 28. From there it is provided to Block 30 (Blocks 28, 30 are described below with reference to FIG. 5) where the luminance and chrominance signals are split apart and each is separately digitized. The chrominance signal is in fact split into two different chrominance signals. The reasons for this is that the chrominance signal has a smaller bandwidth than does the luminance signal, as there is much less detailed information in color across the width of a picture then there is in black and white. The two chrominance signals are then digitally sampled at half the sampling rate of the luminance signal. In a preferred embodiment, the luminance signal is sampled at a rate of about 4.7 MHz with the two chrominance signals sampled at a time interleaved sample rate of 4.7 MHz. The digital information resulting is provided to data latches 34, 36 (FIGS. 2, 3) from block 30 through luminance signal lines 314 and chrominance signal lines 315 (FIG. 3).

The data is loaded into luminance and chrominance memories 300, 302 as addressed through column (horizontal) address latch 315 and row (vertical) address latch 317. Address signals are provided to latch 316 from horizontal counter chain 222 (FIG. 2) and to latch 317 from vertical counter chain 260 (FIG. 2) by lines 318, 319 respectively.

Data from memories 300, 302 is stored in latches 38, 40 (FIG. 3) respectively prior to being output through lines 320, 321 respectively.

The RAS* (row address store) line 322, CAS* (column address store) line 323, and WE (write enable) line 324 operate the above various latches and memories as is known in the art. The INTCOL*, INTROW*, EXTROW*, and EXTCOL* signals on line 326 operate column address register 316, row address register 317, Y address register 309 and X address register 308 (for the below described graphics memory 304) respectively as is known in the art.

Figure 6:
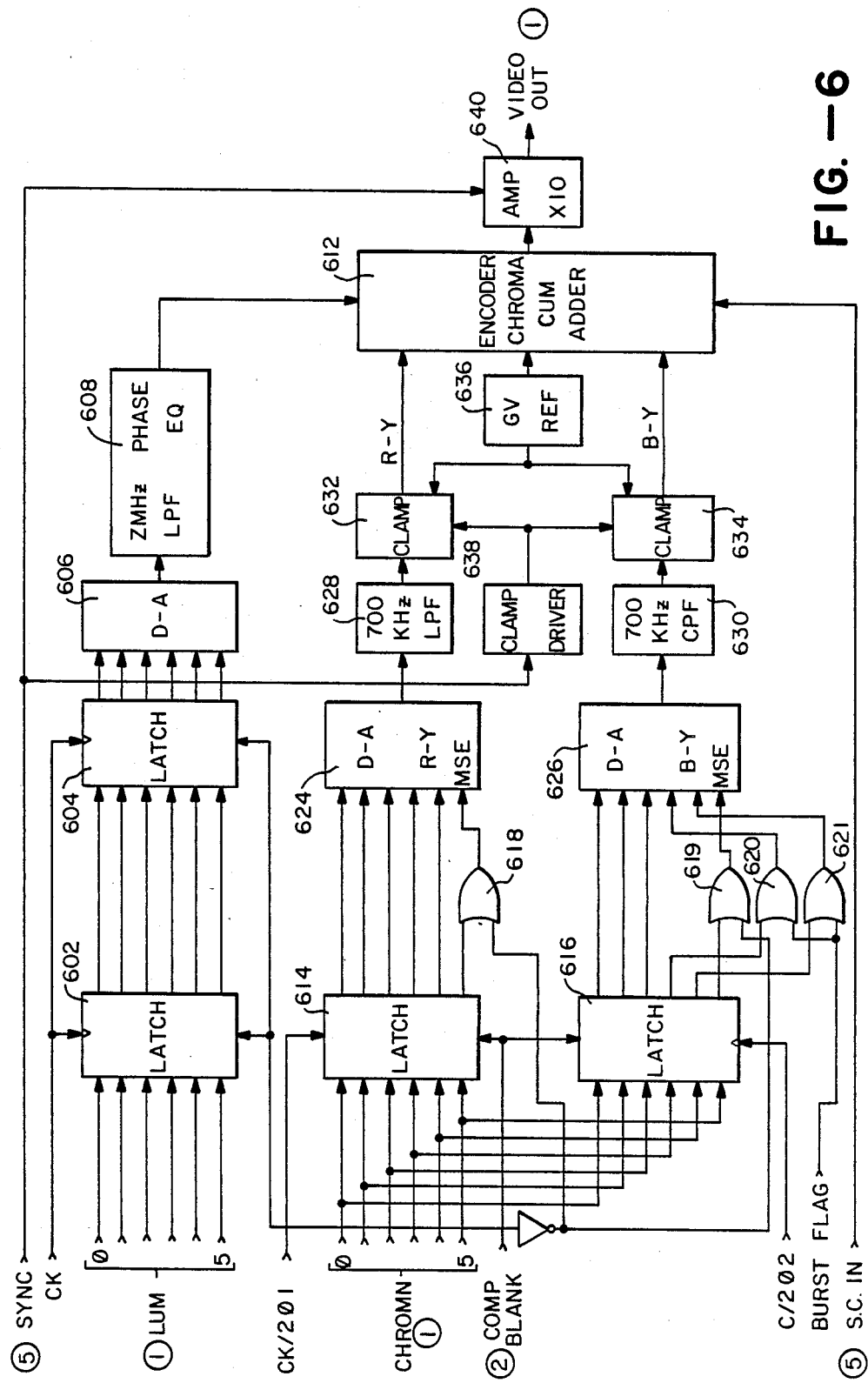
FIG. 6 is a block diagram of the digital to analog conversion circuitry of the embodiment of the invention of FIG. 1.

As is evident from FIGS. 1, 3, the luminance and chrominance signals on latches 34, 36 are transferred directly to latches 38, 40 as well as to field memories 300, 302 for reasons set out below. From latches 38, 40 the signals pass to block 42 where the signals pass through digital-to-analog converters and are remodulated to restore the digital information back to an NTSC color video signal (FIGS. 1, 6). In block 46 the graphics data from the graphics memory 304 is decoded and inserted over the video signal and provided to screen 68.

In operation, at least first and second series of interleaved fields are provided on the media, with each series of fields comprising with a different answer or plot to the video story If the luminance and chrominance signals in the first field are to be displayed, it is provided directly from latches 34, 36 to latches 38, 40 in real time into the restoration circuitry of block 42. Simultaneously the luminance and chrominance signals are sent to the video buffer 32 and in particular to luminance and chrominance buffers 300, 302. The second field, which has data that is not selected to be presented on screen 68, is prevented from passing through the latches 34, 36. The first field stored in video buffer 32 is then read out to take the place of the blocked out second field. In fact the selected first field can be played repetitively until such time as new video signals are acquired from the video media.

One of the reasons for accomplishing this selection between the first field and the second field in the above manner is that the signals which appear on screen 68 have gone through the same digital (A/D) encoding (block 30, FIG. 1) and the same digital (D/A) decoding (block 42, FIG. 1). Consequently the same signal is passed through between latches 34, 36 to latches 38, 40 as is stored in video buffer 32 with all the same modification resulting in no flickering of the video output on screen 68 due to the pass through signal being different from the stored signal.

If instead of two different fields, six fields, for example, were stored, any one of the fields could be selected to the exclusion of the remaining five fields and played directly through the latches and simultaneously stored on video buffer 32 for replay in substitution for each of the other five nonselected fields.

Additionally several video buffers such as buffer 32 (FIG. 1) with appropriate latches such as latches 34, 36, 38, 40 could be added to control 10 so that additional frames can be selectively stored as desired.

In FIG. 3, a graphics overlay memory 304 which is provided data from the CPU 50 as is encoded on the tape medium and which includes character memory 305 and transient memory 306, and along with luminance and chrominance memories 300, 302, comprise the video buffer 32. In a preferred embodiment, video buffer 32 is comprised of a plurality of dynamic RAMs that are configured as 64K×1 RAMs. Latches 316, 317 provide a common address to all of the memories 300, 302, 304. Additionally, these memories can be addressed by the above latches 308, 309 which are addressed on bidirectional bus 310 from the microprocessor unit 48. The above signals (FIG. 7) Internal Column (INTCOL*), Internal Row (INTROW*), External Column (EXTCOL*), and External Row (EXTROW*) on line 326 generated by HROMs 248, 249, 250 (FIG. 2) do not permit more than one of the latches to output the common address line at the same time.

In this embodiment, luminance and chrominance memories 300, 302 are written to or read from and graphics overlay memory 304 is read from during the active horizontal interval of the horizontal scan line. During the horizontal retrace interval of the horizontal scan line, octal latches 308, 309 are contributing X and Y addresses to the graphics overlay memory 304 as controlled by above EXTCOL* and EXTROW* signals on the timing diagrams (FIG. 7). The octal latches 308, 309 are then active to provide addresses to the graphics overlay memory 304 in order to accept graphics data, which addresses and data have been written thereto by the microprocessor unit 48.

The character memory 305 stores textual information, while the transient memory 306 stores such things as lines, arcs, geometric figures and the like which are to overlay the characters so that they may be independently changed or erased without destroying the characters. Accordingly there are two independent overlay graphics planes. If a character string is to be written on the screen 68, overlaying any video picture provided through luminance memory 300 and chrominance memory 302, this character string is written pixel by pixel, one pixel per horizontal scan line interval during the horizontal retrace interval to an address in memory 305. The data to graphics overlay memory 304 is provided by data lines 311, 312 from microprocessor unit 48.

For video buffer output the vertical or row address latch 317 provides the vertical address and is only active just before the left border of the picture. The vertical or row address is passed to the memories 300, 302, 304 and is strobed into the memories by the RAS* signal. In this preferred embodiment, the memory 300, 302, 304 operate in extended page mode. In extended page mode in dynamic memories, it is necessary only to provide a row address only at infrequent intervals. In this case the interval is equivalent to one horizontal scan line interval. Accordingly the vertical or row address is strobed into the buffers 300, 302, 304 just prior to the start of the picture, and referring to FIG. 7, it can be seen that the RAS* (along with INTROW) line has a pulse just prior to the start of the picture, for reading out from the memories 300, 302, 304 to the screen.

In fact as can be seen in FIG. 7, there are two RAS* pulses during the horizontal interval. The first RAS* pulse in time operates with the CAS* signal in order to write graphics data into the graphics memory 304 at the X and Y addresses from the octal latches 308, 309. In this embodiment, CAS* signal also transitions at every pixel for the entire width of the page so as to strobe video data from the media into memory.

In FIG. 3, below the octal latches 308, 309 is a control register 330 which has data which is set by the microprocessor unit 48 by bidirectional bus 310 and which outputs controls as follows. The first output is labeled DSPTP which stands for display transient plane strobe. It is a control bit which enables the entire transient plane to be displayed or blanked. The DSPCP or display character plane strobe is the second control and operates similarly to the DSPTP signal. The third control is a clear bit which is set and maintained for an entire vertical interval and causes the entire character or transient memories 305, 306 to be cleared, depending or which is selected using PLANE. The PLANE signal selects which of the joystick inputs to NAND gates 280, 281 (FIG. 2) is to be read for purposes of multiplexing the X plane and the Y plane joystick inputs. The PLANE signals, as will be discussed below, also determine read/write operations for of the graphics overlay memory 304. The TRACK signal controls whether the first or second track of the media is being displayed. This TRACK signal is provided to multiplexer 266 (FIG. 2) and determines which field is selected by the choice of the FIELD INDEX and which AUDIO signal is selected. The TRACK signal causes the BYPASS* signal to be generated which, as can be seen in FIG. 3, can selectively block video data from passing through latches 34, 36 and can selectively allow video data to pass through latches 34, 36 and be written to memories 300, 302. As can be seen in FIG. 3, the BYPASS* signal is provided to the write enable pin of the memories 300, 302. If more than two tracks were provided on the media, additional strobe bits would be required for the added multiple options. The ENINT signal is the enable interrupt signal, and this is a flag bit or control bit which permits interrupts to be generated. This interrupt is active at the time that data is received and will interrupt anything in progress and cause an interrupt routine to be exercised which will deal with the incoming data. The GAMEN signal or game enable signal is the previously explained pulse which outputs the audio signal from AND gate 273 (FIG. 2) and the video signal from registers 38, 40. GAMEN can prevent further output if more than a predetermined number of game play errors are made by the player or if the player stops game play completely. The DATA signal is a one-bit signal which is written into the character or transient planes of memories 305, 306 as selected by the PLANE signal (discussed below). If the DATA signal is high and the PLANE signal is high, than a bit will be written into the appropriate pixel location of the character memory at the X, Y location as addressed by the X, Y latches 308, 309. If PLANE is set low, then the writing will be done to the transient memory 306 instead of the character memory 305. If the DATA bit is set low, then the bit will be erased in the memory selected by the PLANE signal.

In the lower left-hand portion of FIG. 3, the I/O port decoder 332 for the microprocessor unit 48 is depicted. This port decoder is comprised of two 2×4 decoders. The signals input from the microprocessor unit 48 which is shown on FIG. 4 are WIEN*, A0, A1 and RDEN* and will be discussed below with FIG. 4. The outputs of the decoder include signals PO0* through PO3* and PI0* through PI3*. Output PO0* gives a strobe which latches an address from microprocessor unit 48 into the X address latch 308, while the PO1* gives a strobe which latches an address from microprocessor unit 48 into the Y address latch 309. The PO2* clocks the control register 330. PO3* sets FLIP FLOP 387 causing the BUSY signal to be active. This is clocked through FLIP FLOP 388 by EXTROW* and then combined with WE to ultimately load the selected memory 304 and also clear the BUSY signal. This assures that the X,Y address has been loaded and the microprocessor 50 has commanded a write prior to EXTROW* which is prior to WE. Thus a complete write cycle to memory 304 is assured without the risk of initiating the write cycle too late. If PO3* is late, the controller 10 will wait for the next horizontal blanking internal. The ports PI0* to PI3* consist of time code low, time code high, joystick and status strobes. The PI2* strobe enables the output of the joystick position from latch 283 (FIG. 2) to the bidirectional bus 310 of CPU 50. The PI3* strobe enables the status buffer 370 (FIG. 3) output.

In FIG. 1, to the right of luminance and chrominance (A/D) encoder, Block 30, is Block 56, which provides for the digital data recovery and time codes. This is concerned with recovery of the digital program and time code data which is stored in the vertical blanked interval and providing the data to the microprocessor unit 48. Block 56 provides data and interrupt signals to the central processing unit or CPU 50 of microprocessor unit 48 which also takes input from joystick unit 52 (FIGS. 1, 2).

The code low and code high strobes control some of the circuitry in box 56 of FIG. 1 as is shown in greater detail in the lower right-hand portion of FIG. 3. In this figure, two shift registers, 334, 335 are depicted along with two octal buffers 336, 337 which are identified by the designation time codelow and time code high. These octal buffers have three-state outputs. The outputs of the buffers are controlled by the PI0* and the PI1* signals from the port decoder 332 as these signals are applied to the control pins of the buffers 336, 337.

The input to the first shift register 334 is the most significant bit (labeled A in FIG. 3) which is provided to the luminance memory 300 over line 338. The eighth output from the shift register 334 is provided to the input of shift register 335. The most significant bit provided to the luminance memory 300 is the bit for providing digital program data from the A/D converter presented in box 30 of FIG. 1 (also FIG. 5). Thus digital program data coming off of a horizontal scan line in the vertical interval part (non-video active part) of the picture is shifted into the shift register, and at an appropriate point is strobed into the computer through the shift registers 334, 335 and the buffers 336, 337 to the bidirectional data bus 310 and therefrom to the microprocessor unit 48 as determined by the PI0* time code low strobe and the PI1* time code high strobe. As can be seen in FIG. 3, inputs H256*, H8, DGATE to NAND gate 374 clock shift register 334, 336 to prevent the time code from crowding into the left and right margins where the audio signal (FIG. 8) is stored.

In FIG. 3, below the I/O port decoder 332 in the lower left-hand corner, a Flip Flop 340 is depicted. This provides a signal identified by INT* which is the inverted interrupt signal. The reset input to this Flip Flop 340 is ENINT (enable interrupt) which comes off of the microprocessor control register 330. If ENINT is high, then a DGATE signal, which comes from the ripple out pin of the vertical counter change 220 (FIG. 2) can set an interrupt flag INT* indicating that digital program data is actually present. This INT* signal goes to the microprocessor and interrupts the task in the microprocessor and causes an interrupt service routine to be used which causes I/O port decoder 332 to enable time code buffers 336, 337 so the CPU 50 can read the digital program data residing on registers 334, 335. Accordingly, this above scheme is the method for capturing digital program data off the media and shifting it through the shift registers 334, 335 and providing same to the CPU 50. It is to be remembered that CPU runs the operating system software, a script interpreter and a script, all of which comprise the digital program data which is provided to CPU 50 in the above manner.

In the center lower portion of FIG. 3 is the logic circuitry 342 which accepts raw character data from the character memory 305 over line 311 at an input marked CRAW and also accepts raw transient data from transient memory 306 over line 312 at an input labeled TRAW. This data is latched into Flip Flops 343, 344, which data is then used as an input to an octal latch 345 and also provided to NAND gates 347, 348. Octal latch 345 is set up as two 4-bit shift registers. Flip Flop 377 and NAND gate 375 provide the clock strobe for latch 345.

The output of the data from latch 345 and the output of Flip Flips 347, 348 are presented to the quadruple 2 to 1 multiplexer or selector 346. This arrangement with the subsequent logic circuitry which includes AND gates 350, 351, 352, 353, inverters 354, 355 and OR gate 356 is a way of encoding the graphic attribute data so that the output are provided on four pins from lines 360 and include the signals GRAFEN for graphics enable, RED for the red signal, GRN for the green signal, and BLU for the blue signal. The three-color binary lines indicate whether the red, green or blue signals are active, and the graphics enable signal indicates whether graphics is active or not. This is presented on a pixel by pixel basis and because there are three color lines, it is possible to get eight combinations coded on the screen for any pixel. These attributes control the entire line. Thus all pixels on one line must have the same color but can be different from line to line. Also, the character and Transient planes have their own independent attributes, hence colors. Additionally gate 348 not only indicates that pixel information is presented (as does gate 347) but also controls the selector 346 thus giving transient pixels priority over character pixels. Accordingly, the immediately above identified circuitry is involved with capturing attribute codes from the graphics memory and converting them to color control signals and presenting these to the graphics decode circuitry, Block 46 of FIG. 1.

The digital data representing the graphics is controlled by bits of information carried in the left-hand edge of the horizontal scan line not presented on the screen. This location is shown on the ATTRIBUTES STROBES waveform as a region underneath the AUDIO A pulse on FIG. 7. These attribute strobes occur coincidentally with the AUDIO A recovery pulse and locate a reserved area for the digital data.

To the right of logic circuitry 342 (FIG. 3) is a status buffer 370 which provides status data to the microprocessor unit 48 on bidirectional bus 310. The status buffer 370 receives CRAW and TRAW data from graphics memories 305, 306 which is latched into Flip Flops 371, 372 in addition to whether a right or left input button (R-button, L-button) of the joystick is pressed, the FIELD INDEX (FI) signal telling which field the system is processing, and a busy signal (BUSY) which tells whether the screen 68 is currently being written to. When the microprocessor unit 48 is going to write to the graphics memory 304, signal PO3* from I/O port decoder 332 becomes active low and clocks Flip Flop 387 which causes the BUSY signal to go high. With the BUSY signal high, the microprocessor unit 48 can test this signal until this signal goes away. The microprocessor unit 48 thus knows that a successful write operation has been accomplished. Accordingly, latches 387, 388 are concerned with a handshake routine to the microprocessor unit 48 to enable a check to be made whether or not write has been successfully accomplished and not allow the start of a following write operation partway through the current one. Associated with the write enable, WE, signal are the above Flip Flops 387, 388 and NAND gates 389, 390, 391, 392, 393 and buffers 395, 396. This logic selects which graphics memory is to be written into under control of the PLANE signal if the BUSY signal is active. The CLEAR signal holds the WE signal active, thus flooding the graphics memory with data during one field time.

The data which is output from the graphics character memory 305 and the graphics transient memory 306 which is provided to Flip Flops 371 and 372 is the same data which is displayed on the screen 60. It is a continuous stream of data read out from these memories. The latches 371, 372 are provided with a clocked input which is the write enable (WE) strobe, the waveform for which is shown at the bottom of FIG. 7. This strobe occurs once per horizontal line. This is the strobe which is used at the time the data is written into graphics memory 304 and occurs after X, Y addresses from microprocessor unit 48 have been latched into registers 308, 309 by the EXTCOL*, EXTROW* signals.

Microprocessor Unit 50

In FIG. 4, the microprocessor unit 48 is depicted. Microprocessor unit 48 includes a central processing unit, CPU50 (FIGS. 1, 4), which in a preferred embodiment includes a Z80A chip. The Z80A runs on approximately a 3.5 MHz clock. This clock is derived from a 14.318 MHz signal which is divided by four by Flip Flops 400, 401. The two additional Flip Flops 402, 403 and the NAND gate 404 provide wait states to slow down the instruction fetch cycle of the CPU 50 so that it is compatible with the microprocessors memory 54 which in a preferred embodiment is comprised of ROMs which are collectively identified by the number 66 as previously indicated in FIG. 1. The memory of the microprocessor unit 48 further includes a RAM as previously identified by the number 64 in FIG. 1. The microprocessor unit 48 in this embodiment operates in a manner that is well known in the art. Next to these latches are memory address decoders 405, 406 which address the memory space in the memories 64, 66. These memory address decoders 405, 406 work in the address space of the CPU 50, in contrast to the I/O port decoder 332 in FIG. 3, which works in the I/O control signal space of the CPU 50 which communicates with the I/O lines 309 of the CPU 50. Decoders 405, 406 accept the input from the address bus 407 of the CPU 50 and the memory request signal, $\overline{MREQ}$, in order to access the RAM memory 64 and the ROM memory 66. The RAM 64 stores all the digital program data received from the media as explained in the block diagram of FIG. 1 while the ROM has bootstrap programs and error detecting/correcting routines. The digital program data to be provided will come from the vertical interval (FIG. 7). The RAM 64 will contain all the software which is downloaded from the media. This would be the above indicated primitive software, the script interpreter, operating system, and the current script instructions. The CPU 50 further includes an address bus 407, data bus 408 which communicates with bidirectional bus 310 (FIG. 3).

Lines 407 provide the write enable WTEN* and the read enable RDEN* signals which are communicated to the port decoder 332 of FIG. 3. As can be seen in FIG. 4 the read enable signal, RDEN*, is provided from a combination of the read signal ($\overline{RD}$) and the IO request signal ($\overline{IORQ}$), which is provided to NAND gate 411 and the write enable signal (WTEN*) is generated from the $\overline{IORQ}$ and the write ($\overline{WT}$) signal which is provided to the NAND gate 411. Two additional inputs are provided to the port decoder 332 of FIG. 3. These are the A0 and the A1 which are two bits from the address bus 407. (Define A0, A1.)

Analog Circuitry for Video Buffer

The analog portion of the circuitry for the controller 10 is depicted principally in FIGS. 5 and 6. These figures depict the circuitry which is embodied by several of the blocks previously discussed in FIG. 1. The circuitry of FIG. 5 relates to blocks 14, 28 and 30 of FIG. 1 and account for the video input buffer, synchronization stripper and video clamp of block 14, luminance and chrominance demodulator of block 28 and the luminance and chrominance A/D conversion and chrominance multiplex of block 30.

As can be seen in FIG. 5, the video input to block 14 goes into a video analog buffer and feedback clamp circuit 502. The output from the feedback clamp 502 is provided to a 2 MHz lowpass filter 504. At this point in time, we are dealing with the luminance video information. The next stage includes a video amplifier 506 which amplifies the luminance signal by a factor of 13. The output of video amplifier 506 is fed back to the feedback clamp 502. The output of the video amplifier is also provided to a synchronization stripper 508. This synchronization stripper 508 strips off the synchronization information from the luminance data and provides same to the synchronization separation circuit 239 (FIG. 2) which separates the horizontal synchronization, vertical synchronization and field index pulses. This is also shown in block 16 of FIG. 1. The synchronization stripper 508 includes a comparator (not shown) to provide a digital synchronization signal. The signal from the video amplifier 506 additionally is provided to a six-bit flash A/D converter 510, also known as a parallel A/D converter. In a preferred embodiment, A/D converter 510 is comprised of an RCA chip CA3300. This is where the analog signal is placed in a digital form six bits deep and sampled at a rate of approximately 4.7 MHz. The output of the A/D converter 510 is latched into hex latch 512. The output from the hex latch 512 is then clocked through subsequent latches 514 and 516 is then clocked through subsequent latches 514 and 516 to form a delay of the luminance signal so as to actually match the chrominance signal which has a longer delay period because of the low-pass filter (described below) which has been used for the chrominance signal. From latch 516, the luminance signal is provided to Block 34 of FIG. 1.

The output from the video analog buffer and feedback clamp circuit 502 is also provided to a 3.5 MHz bandpass filter 518. This filter essentially pulls out the chrominance data. From bandpass filter 518, the chrominance signal goes to subcarrier regenerator and demodulator 520 (Block 28, FIG. 1). In a preferred embodiment, the subcarrier regenerator and color signal demodulator 520 is comprised of a RCA chip C3151E. The regenerator and demodulator 520 provides two color signals R-Y, B-Y which contain all of the chrominance data. These two signals then are provided to 700 kHz low pass filters 522, 524. The output from the low-pass filters 522, 524 are the provided to driven clamps 526, 528. The clamps 526, 528 establish a reference level. This reference level is the half-ladder point in the chrominance six-bit flash A/D converter 530. This half-ladder signal is provided through operational amplifier 532 to the clamps 526, 528.

Once these two signals are clamped accurately, they are provided to a high-speed analog switch 534, where analog multiplexing (Block 30, FIG. 1) occurs so that the R-Y and the B-Y signals can be alternately digitized by the six-bit flash A/D converter 530. By this process, the two-color signals are again stepped into a single signal path. The data output from the A/D converter 530 is provided to latch 536 and therefrom to latch 36 of FIG. 1. The clock signals required for this chrominance multiplexing are derived from the oscillator previously described, which is a 4.7 MHz clock. The two clock signals which drive the high speed switch 534 are derived by dividing this clock pulse by 2.

Also FIG. 5 depicts an audio decoder 540. Because of the format that is being used to encode the audio signal onto the video signal, the audio is essentially an analog signal that is sampled at every horizontal interval. This occurs for about 1.5 microseconds on the front porch and the back porch of the horizontal blanking intervals for each track which has been laid down on the media.

The next step for the analog circuitry is to reconstruct from the digital data an analog signal in NTSC format. This is accomplished by block 42 of FIG. 1 which is more fully depicted in FIG. 6. In FIG. 6 the luminance signal is provided from latch 38 (FIG. 1) to hex latch 602 and therefrom to hex latch 604. These latches provide for a compensating delay due to the fact that the chrominance signal will have a longer delay period due to the lowpass filters (described below) than does the luminance signal. The output from the latch 604 is provided to the D/A converter 606 which in a preferred embodiment comprises a DAC-08 manufactured by Precision Monolithics. A signal from the D/A converter 606 is provided to a 2 MHz lowpass filter and phase equalizer 608. The output therefrom is a recontructed luminance signal that has no synchronization. This signal goes to the encoder and chrominance, luminance adder circuit 612 (described below).

The chrominance signal from latch 40 in FIG. 1 is provided to hex latches 614, 616 of FIG. 6 which are part of the Block 42 of FIG. 1. The clocks which drive these latches 614, 616 are the same clocks referred to above which accomplish the high-speed switching of switch 534. The phase which is used to clock the latches 614, 616 will determine whether the R-Y signal or the B-Y signal will be captured by the latches. In this embodiment latch 614 is clocked with phase 1 and latch 616 is clocked with phase 2. This is how the multiplex chrominance channel is digitally demultiplexed. It is to be understood that the six bit data path with successive digital R-Y and B-Y signals will be decoded digitally so as to provide separate six bit data paths which represent the R-Y color component and the B-Y color component. These are the two analog signals which contain all color information in a NTSC color signal.

The additional OR gates 618, 619, 620, 621 perform a blanking function so that during the horizontal and vertical blanking there are no noise components. As can be seen in FIG. 6, a blanking signal is provided to OR gates 618, 619. A color burst flag is provided to OR gates 620, 621 to add a digitally regenerated color burst into the B-Y channel, which color burst signal sits on the back porch of every horizontal interval in the standard NTSC signal. This signal was originally stripped from the chrominance signal and is now added back in prior to the display on the screen 68.

The signals from the latches 614, 616 are provided to D/A converter 624, 626. These converters are similar to D/A converter 606. From these converters, the analog chrominance signal is provided to 700 kHz lowpass filters 628, 630. These signals are clamped by clamps 632, 634 to a reference which in a preferred embodiment is a 6-volt reference provided by Block 636. Clamps 632 and 634 are driven by clamp driver 638. The 6-volt reference is an integral part of the encoder 612. The clamp driver 638 is a 5 to 12 volt converter. In this embodiment, composite synchronization is used as the clamping pulse for the chrominance signal.

The signals from clamps 632, 634, which include the R-Y and the B-Y signals are provided to the single chip encoder 612, which in a preferred embodiment is designated LM 1889 and is manufactured by National Semiconductor. This decoder chip 612 adds the chrominance signal with the luminance signal and produces a composite signal which goes to the output amplifier 640.

Accordingly, the basic process of FIG. 6 is the conversion of the digital signal to analog signal that is seen on the screen.

In Block 46, the graphics output on line 360 (FIG. 3) is decoded into analog signals and added to the signals generated by the circuitry of FIG. 6. This composite signal is then provided to a video analog output buffer and to screen 68.

Other aspects and advantages and objects of the invention can be obtained from a review of the claims and the figures.

I claim:

1. An interactive video controller for selecting between two or more tracks of video image data responsive to the input of a player and for displaying the selected video track, comprising:
   means for receiving a single video signal which is comprised of a predetermined series of successive video fields, said successive video fields having a first series of fields comprising a first track, and a second series of fields intermixed with said first series of fields and comprising a second track;
   means responsive to the input of a player for selecting between one of said first and second tracks;
   memory means for storing at least one most recent video field of the selected track;
   means for outputting successive fields of the selected track onto a video screen, said last named means including means for outputting the at least one most recent video field of the stored track in substitution for the non-selected track until the next successive field to the selected track becomes available so as to provide for a continuous video image.

2. The interactive video controller of claim 1 wherein one or more of the fields contains a graphics request signal, including:
   memory means for storing graphics data;
   means responsive to the graphics request signal for selectively overlaying the graphics data onto the selected track displayed on the video screen.

3. The interactive video controller of claim 1 wherein the memory means stores the selected track, one field at a time.

4. The interactive video controller of claim 1 wherein the outputting means outputs the selected track onto a video screen one field at a time in substitution for fields of the non-selected track so as to provide a continuous video image.

5. The interactive video controller of claim 1 wherein:
   said receiving means can receive a video signal having N tracks of separate data contained thereon, each of the N tracks including a series of fields.

6. The interactive video controller of claim 5 wherein:
   a first track is comprised of a first field, and then the N+1 field, the 2N+1 field and the 3N+1 field;
   a second track is comprised of the second field, and then the N+2 field, the 2N+2 field and the 3N+2 field;
   a third track is comprised of a third field, and then the N+3 field, the 2N+3 field, and the 3N+3 field.

7. The interactive video controller of claim 1 wherein said player input responsive means includes:
   a transducer which produces a player input signal;
   means for sampling said player input signal.

8. The interactive video controller of claim 1 including:

means for separating the input video signal into a luminance signal and a chrominance signal;

means for digitizing the luminance signal prior to directly outputting and storing same;

means for digitizing the chrominance signal prior to directly outputting and storing same.

9. The interactive video controller of claim 8 wherein:

said memory means includes a luminance memory for storing the digitized luminance signal and a chrominance memory for storing the digitized chrominance signal.

10. The interactive video controller of claim 8 including:

means for demodulating the chrominance signal;

means for separating the remodulated chrominance signal into at least a first primary color signal and a second primary color signal;

means for multiplexing the first primary color signal with the second primary color signal; and said means for digitizing the chrominance signal being a means for digitizing the multiplexed chrominance signal.

11. The interactive video controller of claim 9 including:

means for converting the directly output and the stored digitized luminance signal into an analog luminance signal;

means for converting the digitized chrominance signal into an analog chrominance signal;

means for adding, encoding and remodulating the luminance and chrominance signals.

12. The interactiv video controller of claim 10 including:

means for converting the directly output and the stored digitized luminance signal into an analog luminance signal;

means for demultiplexing the directly output and the stored digitized first primary color signal and the digitized second primary color signal;

means for converting the directly output and the stored digitized first primary color signal into an analog signal;

means for converting the directly output and the stored digitized second primary color signal into an analog signal;

means for adding, encoding and remodulating the luminance signal and the first and second primary color signals.

13. The interactive video controller of claim 1 wherein at least one of the tracks of video data has audio data encoded thereon, including:

means for decoding the audio signal.

14. The interactive video controller of claim 1 wherein the two or more tracks contain two or more separate audio signals, including:

means responsive to track selection means for selecting one of the audio signals;

means for decoding the selected audio signal.

15. The interactive video controller of claim 1 including:

means for repeatedly outputting the stored selected track onto a video screen.

16. The interactive video controller of claim 1 including:

a microprocessor unit for generating a graphics display output responsive to the player input means.

17. The interactive controller of claim 2 wherein:

each field is comprised of an inactive vertical retrace interval, and the graphics request signals are provided on the inactive vertical retrace interval.

18. The interactive controller of claim 1 wherein:

at least one of the tracks includes an audio signal;

at least each field of one of the tracks is comprised of a plurality of horizontal scan lines which have an active video interval and an inactive retrace interval; and the audio signal is provided on the inactive retrace interval.

19. The interactive controller of claim 1 including:

a data processor; and wherein at least one track includes coded instructions for the data processor; and wherein each field is comprised of a first plurality of horizontal scan lines defining an active video vertical interval and a second plurality of horizontal scan lines defining an inactive blanked vertical interval; and wherein the coded instructions are provided on the second plurality of horizontal scan lines in the inactive blanked vertical interval.

20. The interactive controller of claim 18 wherein:

the audio signal is a digital signal.

21. The interactive controller of claim 18 wherein:

the audio signal is an analog signal.

22. An interactive video controller for selecting between at least first and second tracks of video data responsive to a player input which first and second tracks are formatted as interleaved fields in a single video signal and with the video data in each field organized into a plurality of horizontal scan lines, the controller comprising:

means for receiving a single video signal comprised of the first and second tracks of successive interleaved fields;

means responsive to the input of a player for selecting between one of said first and second tracks by selecting between interleaved fields;

means for outputting the selected track on a field by field basis;

memory means for simultaneously storing the selected track on a field by field basis;

means for blocking the output of the non-selected track on a field by field basis;

means for outputting the stored track on a field by field basis in substitution for the blocked non-selected track so as to provide for a continuous stream of video data until the next field of the selected track is outputted by said means for outputting the selected track on a field by field basis.

23. An interactive video controller for selecting between a plurality of video tracks of video data interleaved in a predetermined manner as a single predetermined and continuous input video signal containing video data of different tracks at different times comprising:

means for receiving said input video signal;

selection means for selecting one of said plurality of video tracks;

memory means responsive to said selection means for storing video data of the currently selected video track during the times said input video signal contains video data of the selected video track; and means responsive to said memory means for providing a continuous output video signal consisting of video data from the currently selected video track.

24. The interactive video controller of claim 23 including:
means for separating the input video signal into a luminance signal and a chrominance signal;
means for digitizing the luminance signal prior to directly outputting and storing same;
means for digitizing the chrominance signal prior to directly outputting and storing same.

25. The interactive video controller of claim 24 wherein:
said memory means including a luminance memory for storing the digitized luminance signal and a chrominance memory for storing the digitized chrominance signal.

26. The interactive video controller of claim 24 including:
means for demodulating the chrominance signal;
means for separating the demodulated chrominance signal into a least a first primary color signal and a second primary color signal;
means for multiplexing the first primary color signal with the second primary color signal; and
said digitizing means for digitizing the multiplexed chrominance signal.

27. The interactive video controller of claim 24 including:
means for converting the directly output and the stored digitized luminance signal into an analog luminance signal;
means for converting the directly output and the stored digitized chrominance signal into an analog chrominance signal;
means for adding, encoding and remodulating the luminance and chrominance signals.

28. The interactive video controller of claim 24 including:
means for converting the directly output and the stored digitized luminance signal into an analog luminance signal;
means for demultiplexing the directly output and the stored digitized first primary color signal and the digitized second primary signal;
means for converting the directly output and the stored digitized first primary color signal into an analog signal;
means for converting the directly output and the stored digitized second primary signal into an analog signal;
means for adding, encoding and remodulating the luminance signal and the first and second primary color signals.

29. The interactive video controller of claim 23 wherein at least one of the tracks has audio data encoded thereon, including:
means for decoding the audio signals.

30. The interactivve video controller of claim 23 wherein the two or more tracks contain two or more separate audio signals, including:
means responsive to track selection means for selecting one of the audio signals;
means for decoding the selected audio signal.

31. The interactive video controller of claim 23 including:
a microprocessor unit for generating a graphic display output responsive to the player input means.

32. The interactive controller of claim 23 wherein:
at least one of the tracks includes an audio signal;
at least each field of one of the tracks is comprised of a plurality of horizontal scan lines which have an active video interval and an inactive retrace interval; and
the audio signal is provided on the inactive retrace interval.

33. The interactive controller of claim 23 including:
a data processor; and wherein
at least one track includes coded instructions for the data processor; and wherein
each field is comprised of a first plurality of horizontal scan lines defining an active video vertical interval and a second plurality of horizontal scan lines defining an inactive blanked vertical interval; and wherein
the coded instructions are provided on the second plurality of horizontal scan lines in the inactive blanked vertical interval.

34. The interactive controller of claim 32 wherein:
the audio signal is a digital signal.

35. The interactive controller of claim 32 wherein:
the audio signal is an analog signal.

36. The interactive video controller of claim 23 wherein said predetermined and continuous input video signal is comprised of fields of the plurality of video tracks interleaved in a predetermined manner, each field of all video tracks also containing sound information for a plurality of audio tracks, and further comprised of audio means coupled to said means for receiving said single input video signal for providing an audio signal of one of said audio tracks comprised of the corresponding sound information from all video track fields and responsive to the selected video track.

37. The interactive video controller of claim 36 wherein said predetermined and continuous input video signal is comprised of a plurality of video tracks equal to (N) and wherein each track (n) is comprised of the n, N+n, 2N+n, 3N+n . . . fields of said predetermined and continuous input video signal, when n ranges from 1 to N.

38. The interactive video controller of claim 36 wherein the number of audio tracks and video tracks are equal.

39. The interactive video controller of claim 36 wherein the number of audio tracks and video tracks are unequal.

40. The interactive video controller of claim 23 for selecting between a plurality of video tracks of video data comprising interleaved fields of the plurality of video tracks.

41. The interactive video controller of claim 40 wherein said means responsive to said memory means for providing an output continuous video signal is also responsive to said means for receiving said single input video signal and said selection means to provide, as part of said continuous output video signal, fields of the selected video track from said means for receiving said single input video signal during the times said input video signal contains video data of the selected track.

42. The interactive video controller of claim 41 further comprised of means for converting said fields of the selected video track during the times said input video signal contains video data of the selected track to a form directly storable in said memory means, and for converting said fields back to the form of said continuous output video signal, whereby all fields of said continuous output video signal have been subjected to substantially the same processing prior to forming part of the output continuous video signal.

43. The interactive video controller of claim 40 further comprised of graphics means for adding graphics information to the video data of said continuous output video signal.

44. The interactive video controller of claim 43 wherein said graphic means is responsive to a manual controller.

45. The interactive video controller of claim 23 further comprised of graphics means for adding graphics information to the video data of said continuous output video signal.

46. The interactive video controller of claim 45 wherein said graphics means is responsive to a manual controller.

47. The interactive video controller of claim 23 wherein said means for receiving said video signal is a receiver means for receiving an over the air signal.

48. The interactive video controller of claim 47 further comprised of a video tape playback unit coupled to said means for receiving said input video signal to provide said single predetermined and continuous input video signal thereto.

* * * * *

UNITED STATES PATENT AND TRADEMARK OFFICE
CERTIFICATE OF CORRECTION

PATENT NO. : 4,839,743

DATED : 6/13/89

INVENTOR(S) : Best et al.

It is certified that error in the above-identified patent and that said Letters Patent is hereby corrected as shown below:

| | | |
|---|---|---|
| col. 01, line 24 | delete "merchanidising" | insert --merchandising-- |
| col. 04, line 23 | delete "anser" | insert --answer-- |
| col. 06, line 34 | delete "cunt" | insert --count-- |
| col. 07, line 07 | delete "tp" | insert --to-- |
| col. 08, line 17 | delete "opertational" | insert --operational-- |
| col. 13, line 21 | delete "336" | insert --335-- |
| col. 14, line 59 | delete "60" | insert --68-- |
| col. 16, line 25/26 | after "516" | delete "is then clocked through subsequent latches 514 and 516" |
| col. 16, line 45 | delete "the" | insert --then-- |
| col. 19, line 33 | delete "interactiv" | insert --interactive-- |
| col. 21, line 59 | delete "interactivve" | insert --interactive-- |

Signed and Sealed this

Second Day of April, 1991

*Attest:*

HARRY F. MANBECK, JR.

*Attesting Officer*       *Commissioner of Patents and Trademarks*